(12) United States Patent
Jinzaki

(10) Patent No.: US 7,161,940 B2
(45) Date of Patent: Jan. 9, 2007

(54) BROADCASTING COMMUNICATIONS SYSTEM

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 933 days.

(21) Appl. No.: 10/067,295

(22) Filed: Feb. 7, 2002

(65) Prior Publication Data

US 2003/0026256 A1    Feb. 6, 2003

(30) Foreign Application Priority Data

Jul. 31, 2001    (JP)    ............................. 2001-231361

(51) Int. Cl.
*H04L 12/28*    (2006.01)
(52) U.S. Cl. ...................... 370/390; 370/392
(58) Field of Classification Search ................ None
See application file for complete search history.

(56) References Cited

U.S. PATENT DOCUMENTS

| 5,764,895 | A | 6/1998 | Chung |
| 6,061,730 | A | 5/2000 | Billings |
| 6,067,571 | A | 5/2000 | Sato et al. |
| 6,282,578 | B1* | 8/2001 | Aizono et al. ............... 719/310 |
| 6,308,218 | B1* | 10/2001 | Vasa ........................... 709/238 |
| 2003/0046417 | A1* | 3/2003 | Ellis ........................... 709/232 |
| 2003/0165160 | A1* | 9/2003 | Minami et al. ............. 370/466 |

OTHER PUBLICATIONS

European Search Report for Application No. EP 02 25 0965 dated Dec. 2, 2003.

* cited by examiner

*Primary Examiner*—Duc Ho
(74) *Attorney, Agent, or Firm*—Staas & Halsey LLP

(57) ABSTRACT

The transmission server according to the present invention includes a processor, buffer memory, an I/O bus, and a transmission unit. Furthermore, the transmission unit includes a transmitting unit for controlling the generation and transmission of a packet, buffer memory for holding transmission data provided by the processor, and an NIC for connection to a network. The processor manages receivers, and transfers data in the buffer memory to be transmitted to the transmission unit connected to the I/O bus. The transferred data is stored in the buffer memory of the transmission unit. The transmission unit generates a packet for each receiver from the data in the buffer memory according to the receiver information, and transmits the data to a network through the NIC.

22 Claims, 26 Drawing Sheets

|  | MULTICAST | UNICAST |
|---|---|---|
| LOAD ON TRANSMISSION SIDE | 1 (SMALL) | PROPORTIONAL TO NUMBER OF RECEIVERS (LARGE) |
| ADDRESS MANAGEMENT | MULTICAST ADDRESS MANAGEMENT (COMPLICATED) | NORMAL ADDRESS MANAGEMENT (SIMPLE) |
| NETWORK CONTROL | MULTICAST ROUTING (COMPLICATED) | NORMAL ROUTING (SIMPLE) |
| CONTROL ON RECEPTION SIDE | MULTICAST GROUP MANAGEMENT (COMPLICATED) | NORMAL NETWORK CONTROL (SIMPLE) |

FIG. 4

PRIOR ART

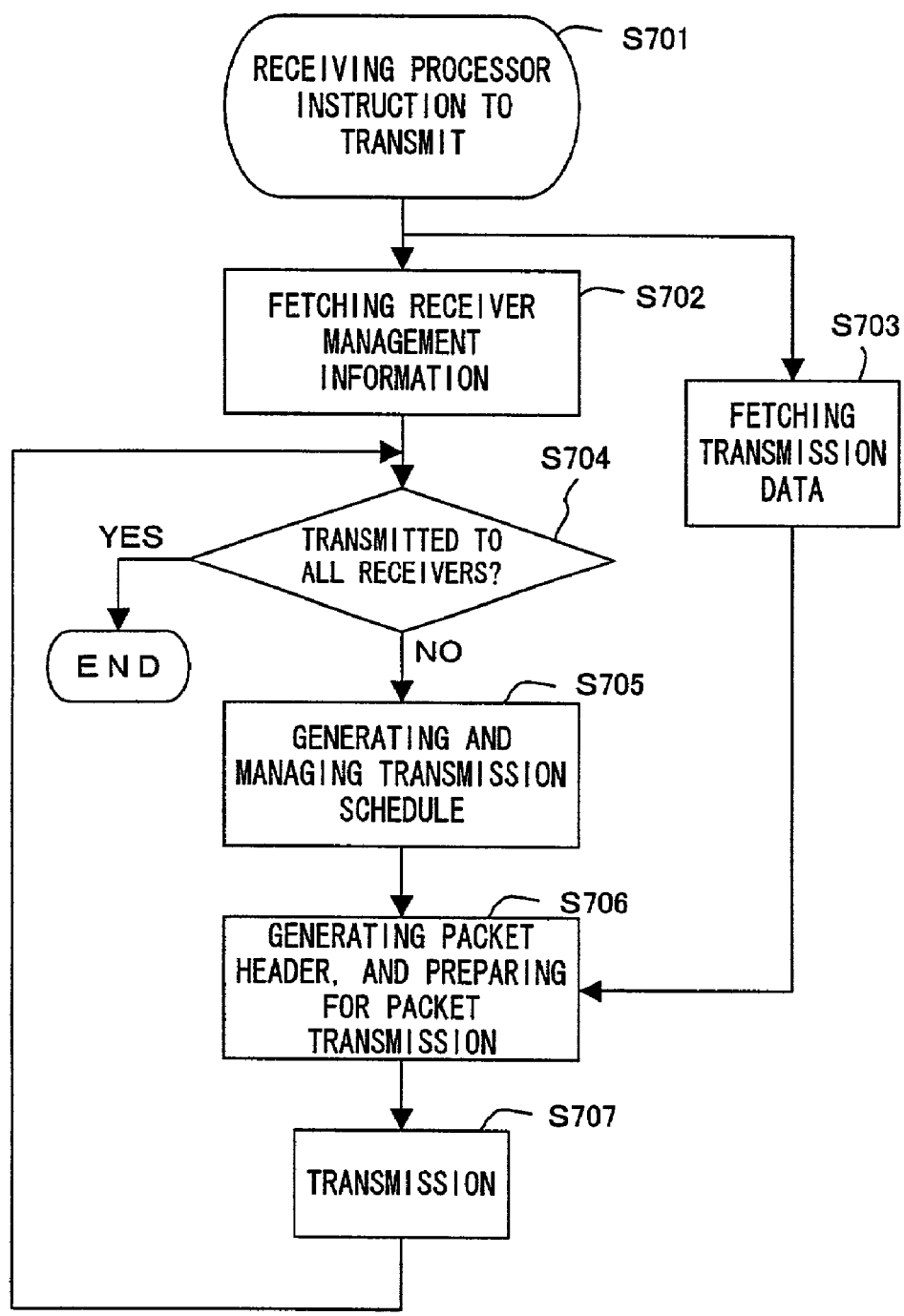
F I G. 7

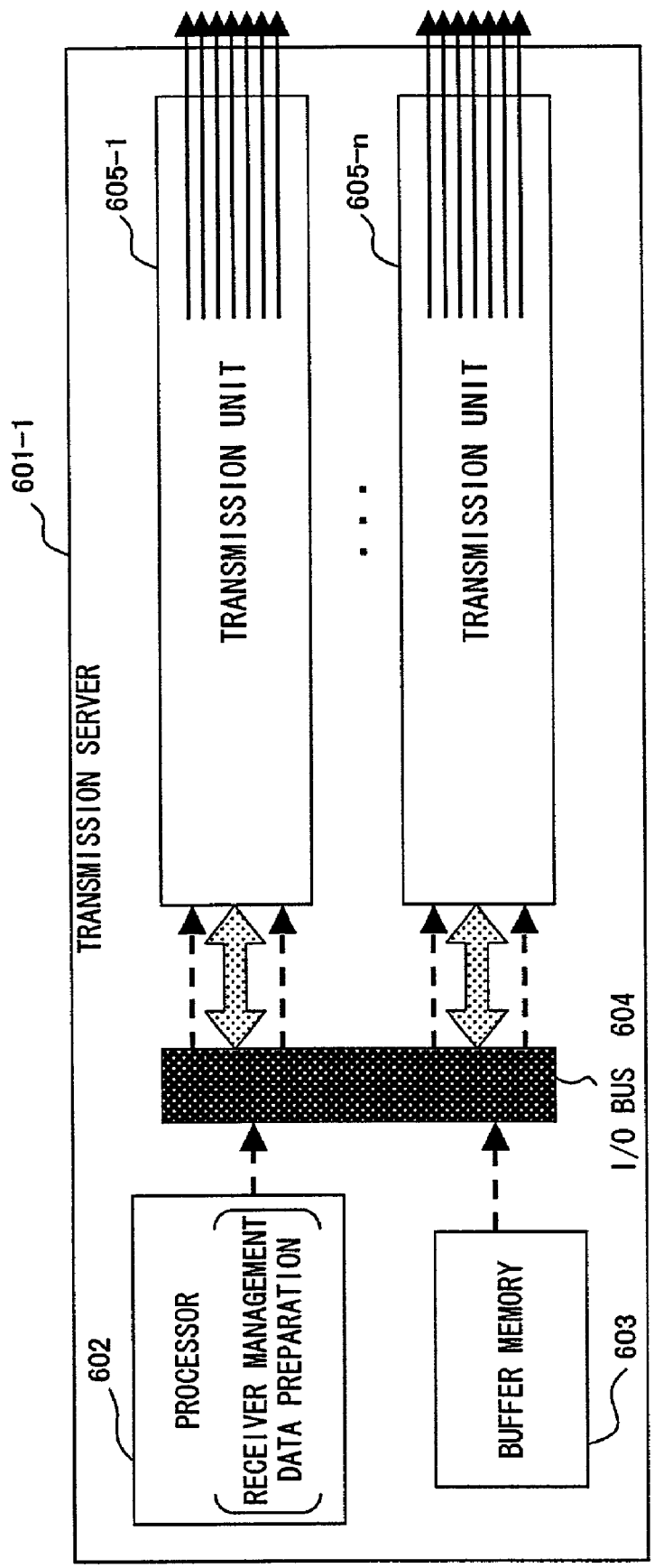
F I G. 8

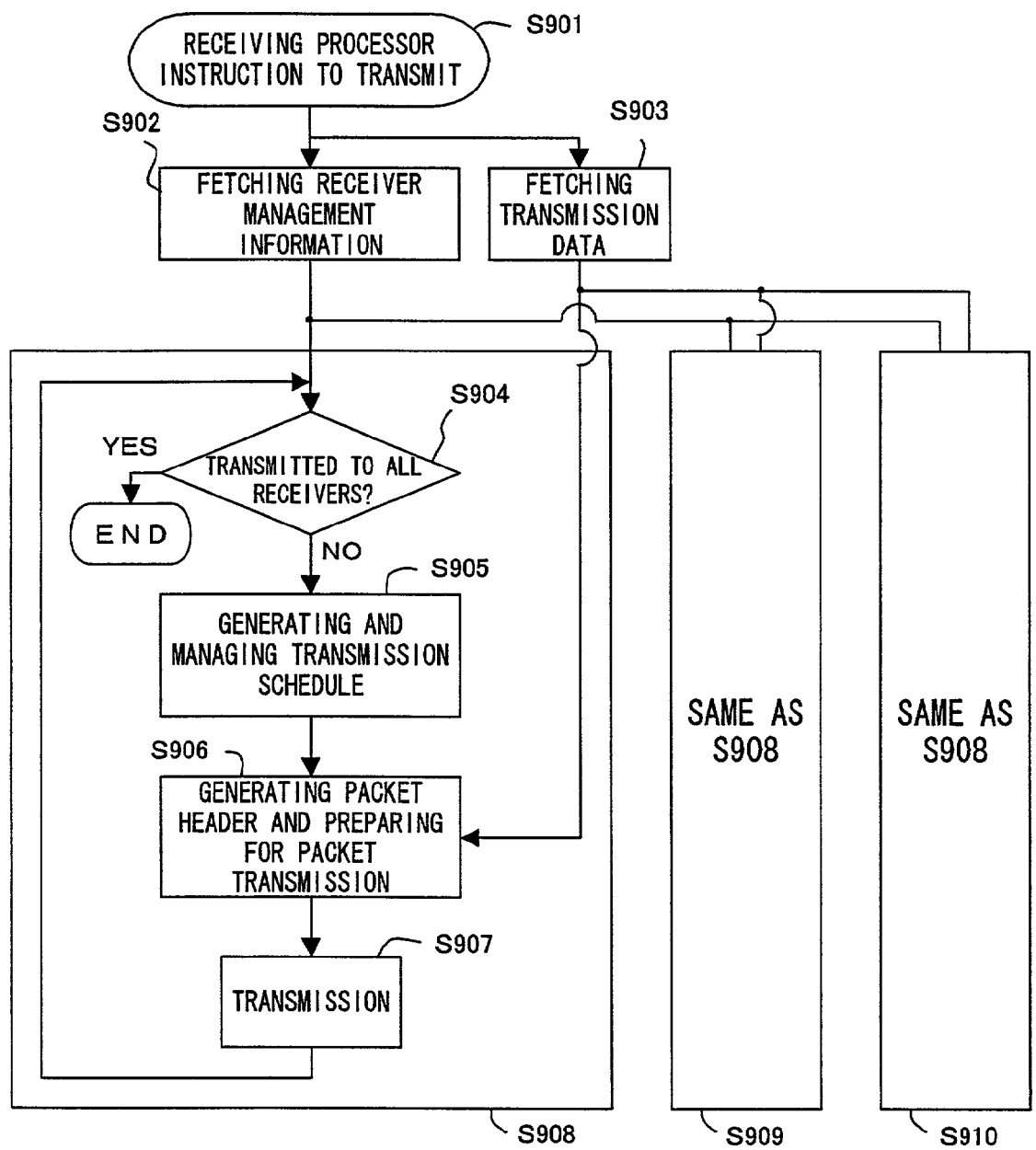
F I G. 9

| | DESTINATION | TIME PARAMETER | DATA LENGTH |
|---|---|---|---|
| | A | 1ms | 512Kbyte |
| | B | 5ms | 512Kbyte |
| D | A | 0ms | 512Kbyte |
| D | B | 5ms | 512Kbyte |
| | C | | 1500Kbyte |
| | ⋮ | ⋮ | ⋮ |

F I G. 1 6

| | byte 0 | | byte 1 | byte 2 | byte 3 |
|---|---|---|---|---|---|
| 0 | VERS | HLEN | TOS | TOTAL LENGTH | |
| 4 | IDENTIFICATION | | | FLAG | FRAGMENT |
| 8 | TIME TO LIVE | | PROTOCOL | HEADER CHECKSUM | |
| 12 | SOURCE IP ADDRESS | | | | |
| 16 | DESTINATION IP ADDRESS | | | | |
| 20 | IP OPTION & PADDING | | | | |

IP HEADER

| | byte 0 | byte 1 | byte 2 | byte 3 |
|---|---|---|---|---|
| 0 | UDP SOURCE PORT | | UDP DESTINATION PORT | |
| 4 | UDP MESSAGE LENGTH | | UDP CHECKSUM | |

UDP HEADER

| | byte 0 | | | | byte 1 | | byte 2 | byte 3 |
|---|---|---|---|---|---|---|---|---|
| 0 | V=2 | X | P | CC | M | PT | SEQUENCE NUMBER | |
| 4 | timestamp | | | | | | | |
| 8 | synchronization source (SSRC) identifier | | | | | | | |
| 12 | contributing source (CSRC) | | | | | | | |
| n | | | | | | | | |

RTP HEADER

F I G. 1 8

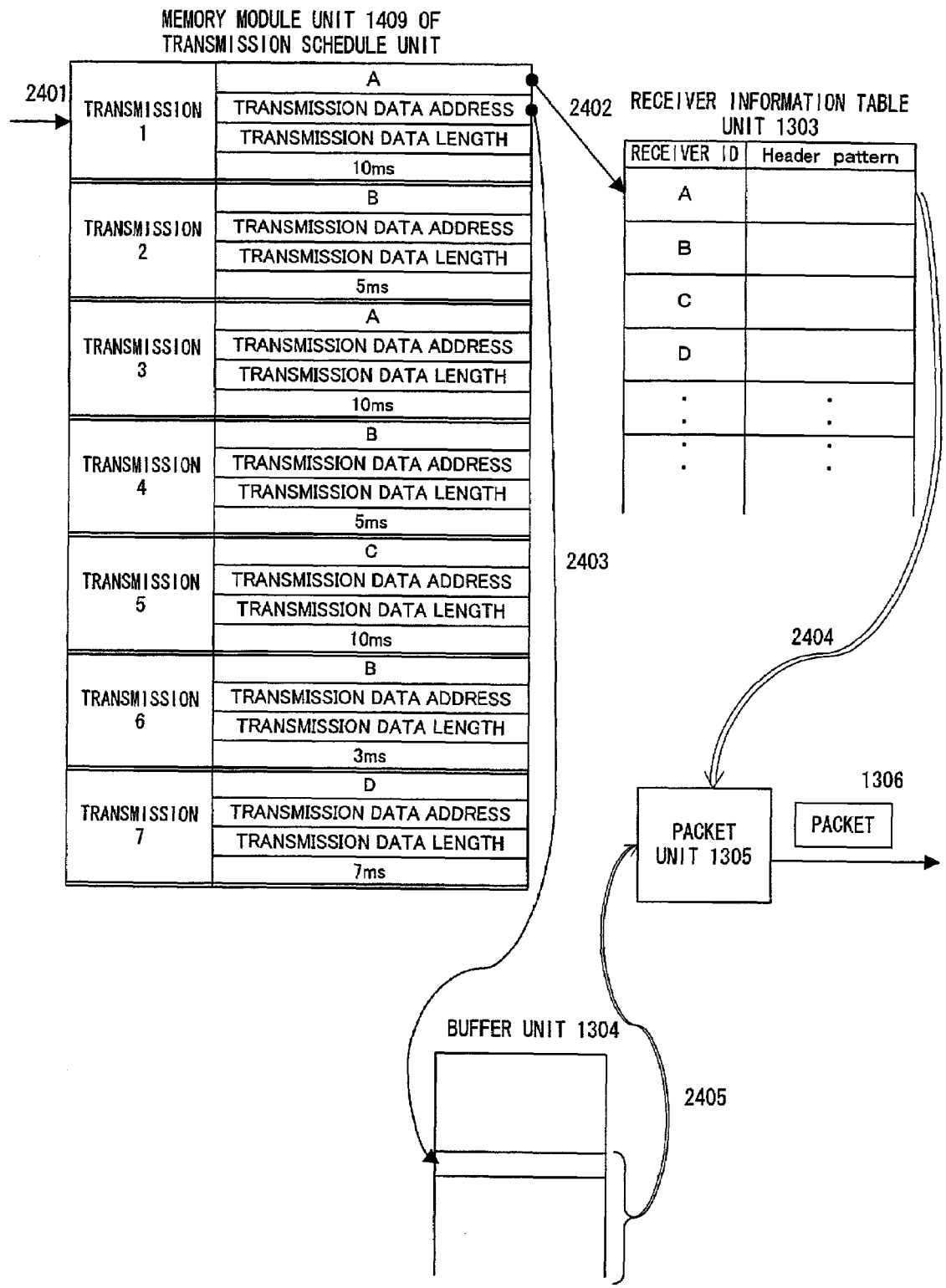
F I G. 2 4

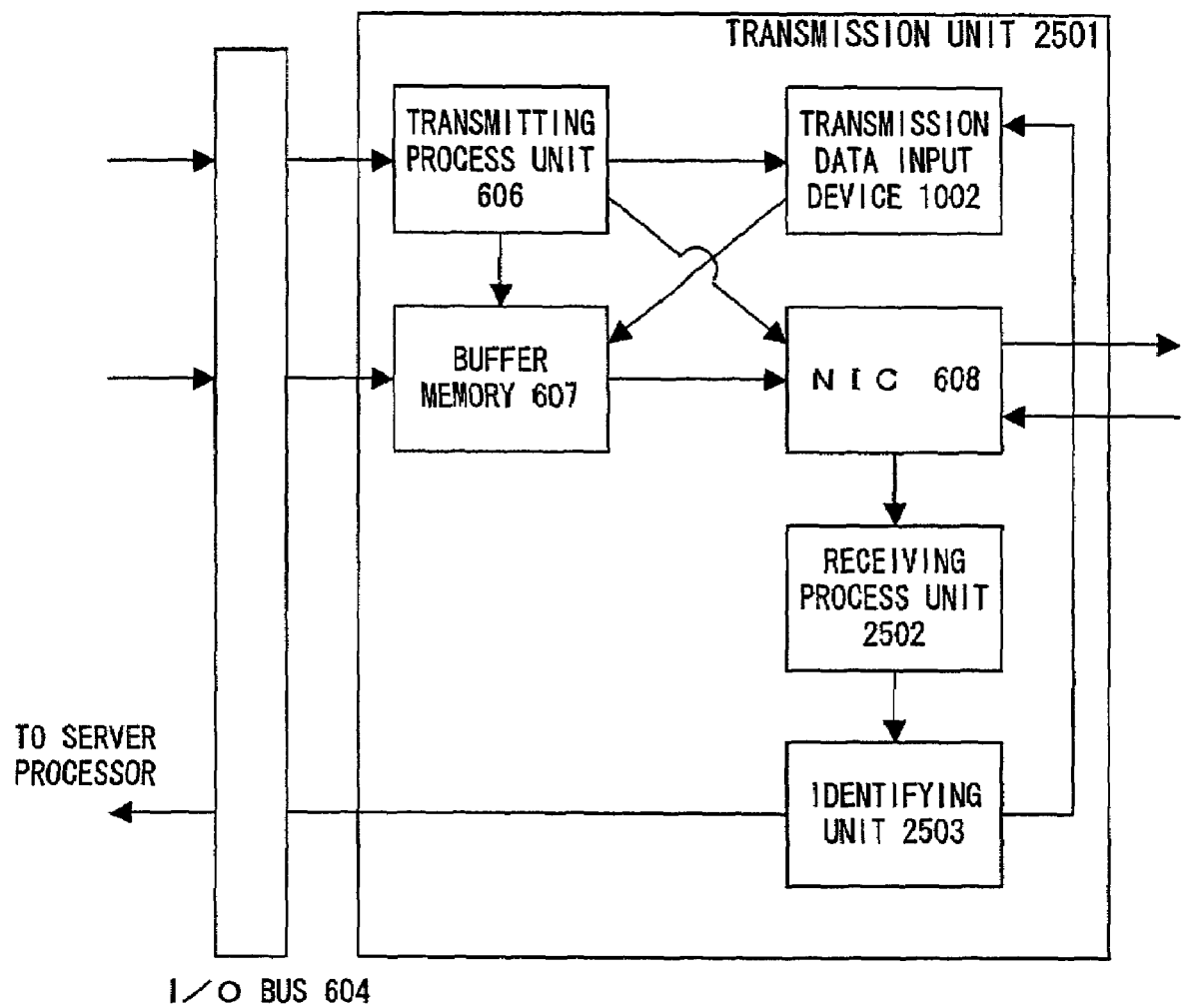
F I G. 2 5

BROADCASTING COMMUNICATIONS SYSTEM

BACKGROUND OF THE INVENTION

1. Field of the Invention

The present invention relates to a system of performing broadcasting communications using packet communications, and more specifically to an information processing device with the load on the transmission side reduced.

2. Description of the Related Art

Conventionally, broadcasting communications for transmitting data from a transmitter to a plurality of receivers have been widely used. A TV broadcast is an example of broadcasting communications using an electronic wave.

Recently, there is an increasing demand for broadcasting communications using packet communications which are basically one to one communications of a transmitter 101 and a receiver 103. The transmission of an image and voice using a streaming operation through Internet is an example of the communications.

The technology of performing the broadcasting communications through a packet communications network such as Internet can be a system using a multicast and a unicast.

FIG. 2 shows the broadcasting communications through a multicast. In the multicast communications, a transmitter 201 transmits a packet having a predetermined multicast address, and a network 202 transmits the packet by copying and transmitting the packet according to a predetermined path information, thereby distributing data to a plurality of receivers (203, 204). A receiver can receive a packet by entering a receiver group of multicast addresses of a network 2302.

FIG. 3 shows the broadcasting communications using a unicast. Since the unicast communications are one to one packet communications, a transmitter 301 can realize the broadcasting communications by transmitting the same data to all receivers (303, 304).

The systems using the above mentioned multicast and unicast have respective merits and demerits. FIG. 4 collectively shows the comparison between a multicast and a unicast in the broadcasting communications. Relating to the load on the transmitter side, the transmitter transmits a packet only once to a multicast address in the multicast system while a packet is transmitted to each receiver in the unicast system. Therefore, the load on the transmitter side increases proportional to the number of receivers. However, the three items, that is, address management, network control, and control on the receiver side, become complicated in the multicast system while they are still simple in the unicast system because they are the same as one to one packet communications.

Because of the above mentioned merits and demerits of these systems, both systems are practically used as necessary. Which is to be selected depends on the target, but the multicast system requires an address and routing management while the unicast system is used more widely because it requires no special management. The image/voice broadcast frequently referred to as Webcast in Internet uses a unicast system.

To realize the broadcasting communications through packet communications, the following processes 1) through 3) are basically required. 1) receiving a transmission request from a receiver (receiver management), 2) preparing transmission data (preparing data), 3) transmitting data according to communications procedure such that a different communications condition can be satisfied for each receiver (transmitting process).

In the conventional system, all these processes 1) through 3) are performed by a transmission server 501 which is an information processing device on the transmitter side through processor control (FIG. 5). Especially, in the broadcasting communications through a unicast, data corresponding to the number of receivers is to be transmitted, thereby increasing the load of each process by a processor 502.

Furthermore, relating to 2) preparing data, the data portion occupying the majority of a packet is the same regardless of a receiver in the broadcasting communications. However, since a packet header, etc. is different, all packet data has to be transferred to each receiver. Therefore, a different packet is generated in memory 503 of a transmission server 501 for each receiver, and is transferred to NICs (corresponding to a network interface card, and a network adapter) 505 and 506 connected to an I/O bus 504. As a result, there is the problem that the load of the I/O bus 504 increases.

Furthermore, relating to 3) transmitting process, since the transmitting process is a real time process, the real time process cannot be guaranteed when the number of simultaneously connected receivers increases, thereby failing in obtaining predetermined transmission quality. That is, to adjust the transmission quality, at least the following a) through c) are typical examples of parameters to be changed for each receiver. Accordingly, it is difficult to individually control the receivers when the number of simultaneously connected receivers increases.

a) A parameter to be amended according to the network address of a receiver and the communications procedure:

A parameter such as a network address of a receiver, an available protocol, etc. to be transmitted to a receiver.

b) A data length to be transferred in one packet:

An MTU (maximum transfer unit) determines the length of one packet. Since the length of a packet which can be efficiently transferred depends on the network to which a receiver is connected, the transmission quality can be improved by transmitting a packet of the optimum data length.

c) Smoothing the speed (rate) of transmitting a packet:

It is desired that packets can be transmitted at the same transfer speed if possible. However, the rate of the network on the transmission server side is normally high while the rate of the network on the receiver side is low in most cases. Therefore, if the transmission server intermittently transmits data, the receiver may not be able to receive the data transmitted collectively and intermittently. The discard of data due to the congestion can occur in a network from a transmission server to a receiver. Therefore, smoothly transmitting data from the transmission server can improve the transmission quality.

SUMMARY OF THE INVENTION

The present invention aims at solving the problems with the conventional transmission server by a transmission server, which is an information processing device of a transmitter, not only increasing the number of receivers who can simultaneously receive a service, but also preventing the transmission quality from being reduced. To be more practical, the processor load of a transmission server and the I/O path load are to be reduced so that the transmission quality can be adjusted at a request of a receiver.

To solve the above mentioned problems, the present invention provides a transmission unit corresponding to the network adapter connected to the I/O bus of a transmission server, and transmission server generates and transmits a packet corresponding to each receiver according to the information about a receiver and the transmission data provided from the processor of the transmission server through the connection unit to the I/O bus.

According to an aspect of the present invention, the transmission unit includes: a transmission schedule unit for controlling a transmission schedule including a packet transmission order and packet timing; a receiver information management unit for managing the information about the receiver; a buffer unit for storing and managing the transmission data; and a packet unit for generating and transmitting a packet to a specified receiver according to the transmission schedule.

With the above mentioned configuration, the processor of the transmission server performs receiver management, transfers the data once to be transmitted to the transmission unit connected to the I/O bus, and can reduce the processor load of the transmission server and the I/O bus load. Furthermore, the transmission quality can be adjusted at a request of a receiver to generate and transmit a packet for each receiver.

BRIEF DESCRIPTION OF THE DRAWINGS

FIG. 4 shows the comparison between a multicast and a unicast in the broadcasting communications;

FIG. 7 shows the flow of the process of the transmission server shown in FIG. 6;

FIG. 8 shows the application (1) of the configuration indicating the principle of the present invention;

FIG. 9 shows the flow of the process of the transmission server shown in FIG. 8;

FIG. 16 shows an example of adjusting the transmission schedule unit;

FIG. 18 shows a packet header of an RTP/IPv4;

FIG. 24 shows the operation of the transmission unit;

FIG. 25 shows the process performed on a received packet; and

DESCRIPTION OF THE PREFERRED EMBODIMENT

The embodiments of the present invention are described below by referring to the attached drawings.

The system of reducing the load of the information processing device on the transmission side in the broadcasting communications through a unicast is referred to in the following explanation of the embodiments of the present invention. It is also applicable to the broadcasting communications through a multicast, and is especially effective for a high-speed data broadcast.

Figure 1:
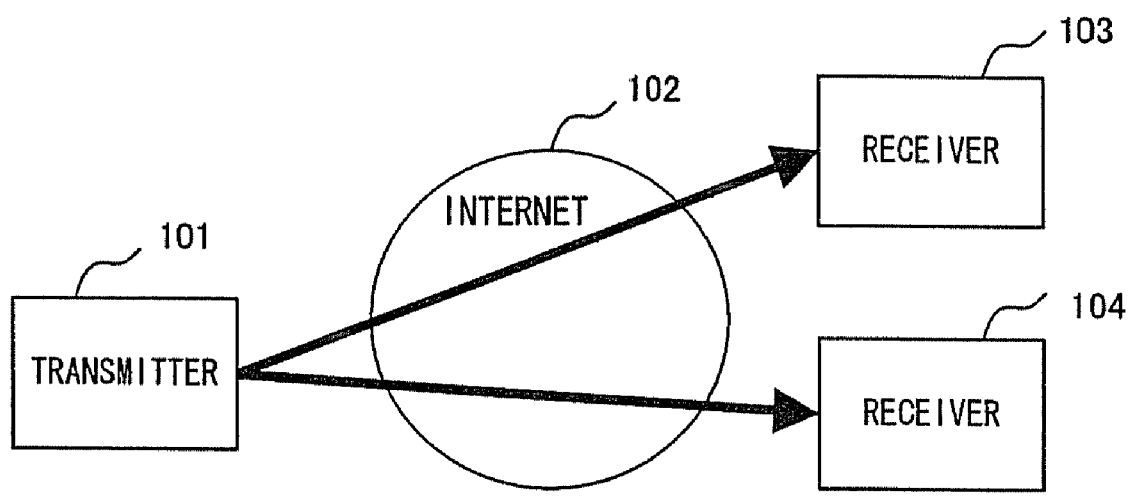
FIG. 1 shows the broadcasting communications.
Figure 2:
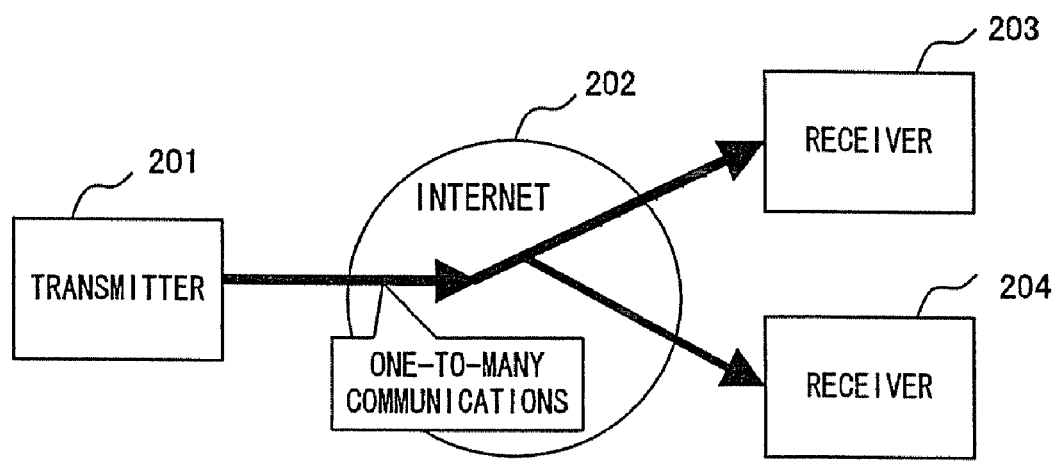
FIG. 2 shows the broadcasting communications through a multicast.
Figure 3:
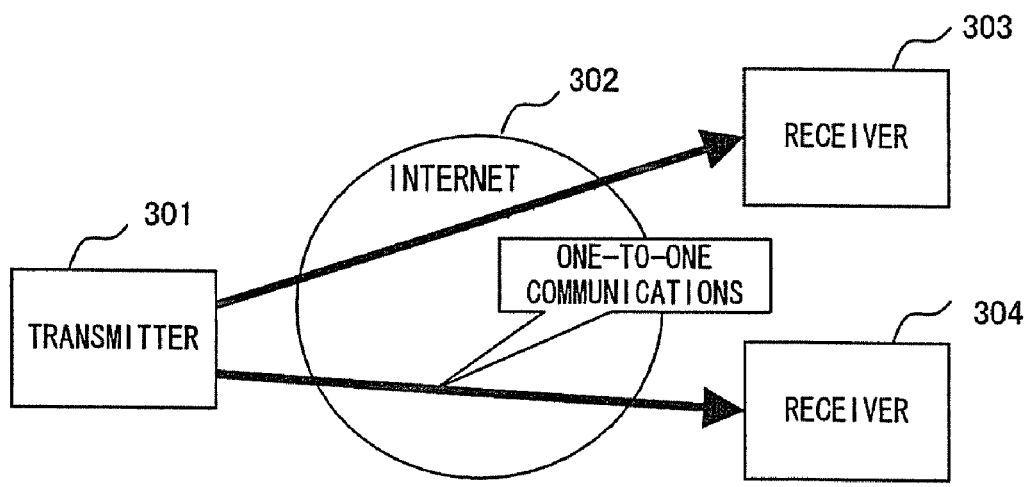
FIG. 3 shows the broadcasting communications through a unicast.
Figure 5:
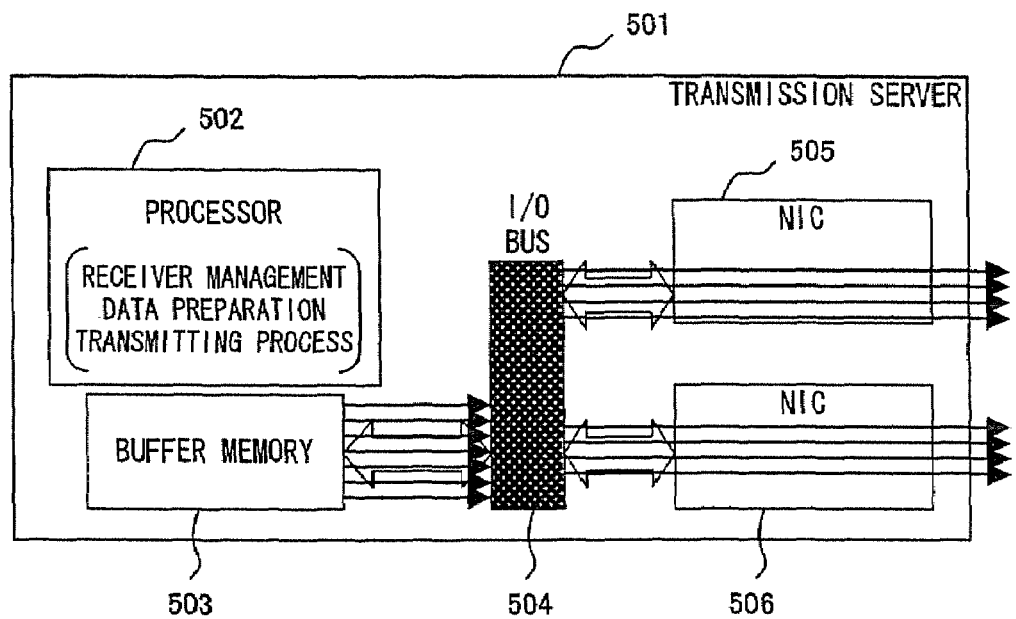
FIG. 5 shows the configuration of the transmission server in the conventional system.
Figure 6:
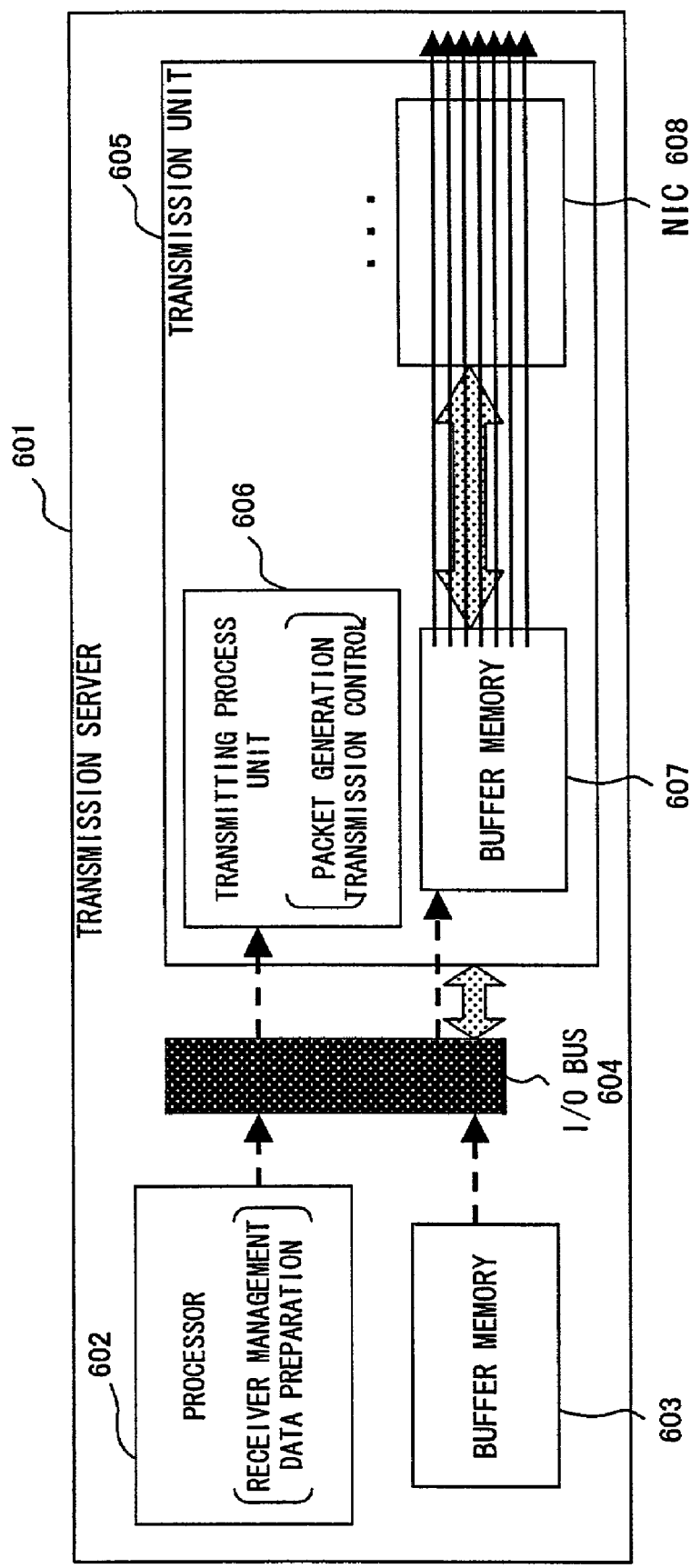
FIG. 6 shows the configuration indicating the principle of the present invention.

FIG. 6 shows the configuration indicating the principle of the present invention. A transmission server 601 which is an information processing device for realizing the present invention comprises a processor 602, buffer memory 603, an I/O bus 604, and a transmission unit 605. The transmission unit 605 comprises a transmitting process unit 606 for controlling the generation and transmission of a packet, buffer memory 607 for holding transmission data provided by the processor 602, and an NIC 608 for connection to a network. The processor 602 manages receivers, and transfers the data stored in the buffer memory 603 to be transmitted to the transmission unit 605 connected to the I/O bus 604 through, for example, a connection unit such as a PCI, etc. The transferred data is held in the buffer memory 607 of the transmission unit 605. The transmitting process unit 606 generates a packet for each receiver according to receiver information, and transmits it to a network through the NIC 608.

FIG. 7 shows the flow of the process of the transmission server 601 shown in FIG. 6. The process of the transmission server 601 according to the present invention is performed mainly by the transmitting process unit 606, not by the processor 602. First, the processor 602 issues an instruction to transmit data (S701). Then, the receiver management information (S702) and transmission data (S703) are transferred to the transmission unit 605. Furthermore, the transmission unit 605 determines transmission data has been transmitted to all receivers (S704), and the process terminates if YES. If NO, a transmission schedule is generated and managed (S705), a packet header is generated, a packet is generated from a packet header and the transmission data fetched in S703, and a preparation is made for transmitting the packet (S706). Then, the packet is transmitted (S707) and control is returned to S704.

In the transmission server 601 shown in FIG. 6, the number of receivers who can be simultaneously provided with a service is limited depending on the capability of the transmission unit 605, but the performance can be improved by connecting a plurality of transmission units 605 to the I/O bus. FIG. 8 shows a transmission server 601-1 provided with a plurality of transmission units 605-1 through 605-n. FIG. 8 shows the same configuration as FIG. 6 except the plurality of transmission units 605-1 through 605-n.

FIG. 9 shows the flow of the process of the transmission server 601-1 shown in FIG. 8. First, the processor 602 issues an instruction to transmit data (S901). Then, the receiver management information (S902) and the transmission data (S903) are transferred to the transmission units 605-1 through 605-n. Since each of the transmission units 605-1 through 605-n performs the same process, the process S908 of the transmission unit 605-1 is described below. First, it is determined (S904) whether or not transmission data has been transmitted to all receivers, and the process terminates if YES. If NO, the transmission schedule is generated and managed (S905), a packet header is generate, a packet is generated from the packet head and the transmission data fetched in S903, and a preparation is made for transmitting the packet (S906). Then, the packet is transmitted (S907) and control is returned to S904.

The transmission server 601 shown in FIG. 6 can be further designed such that the transmission unit 605 can be replaced with an input transmission unit 1001 provided with a transmission data input device 1002 for obtaining the transmission data. In a transmission sever 601-2 shown in FIG. 10, the processor 602 only manages receivers, and the receiver management information is the only data transferred through the I/O bus 604. The transmission data is obtained by the transmission data input device 1002 such as a camera, etc., and is held in the buffer memory 607. Then, the transmitting process unit 606 generates a packet for each receiver according to the receiver information, and transmits the generated packet to a network through the NIC 608.

Figure 10:
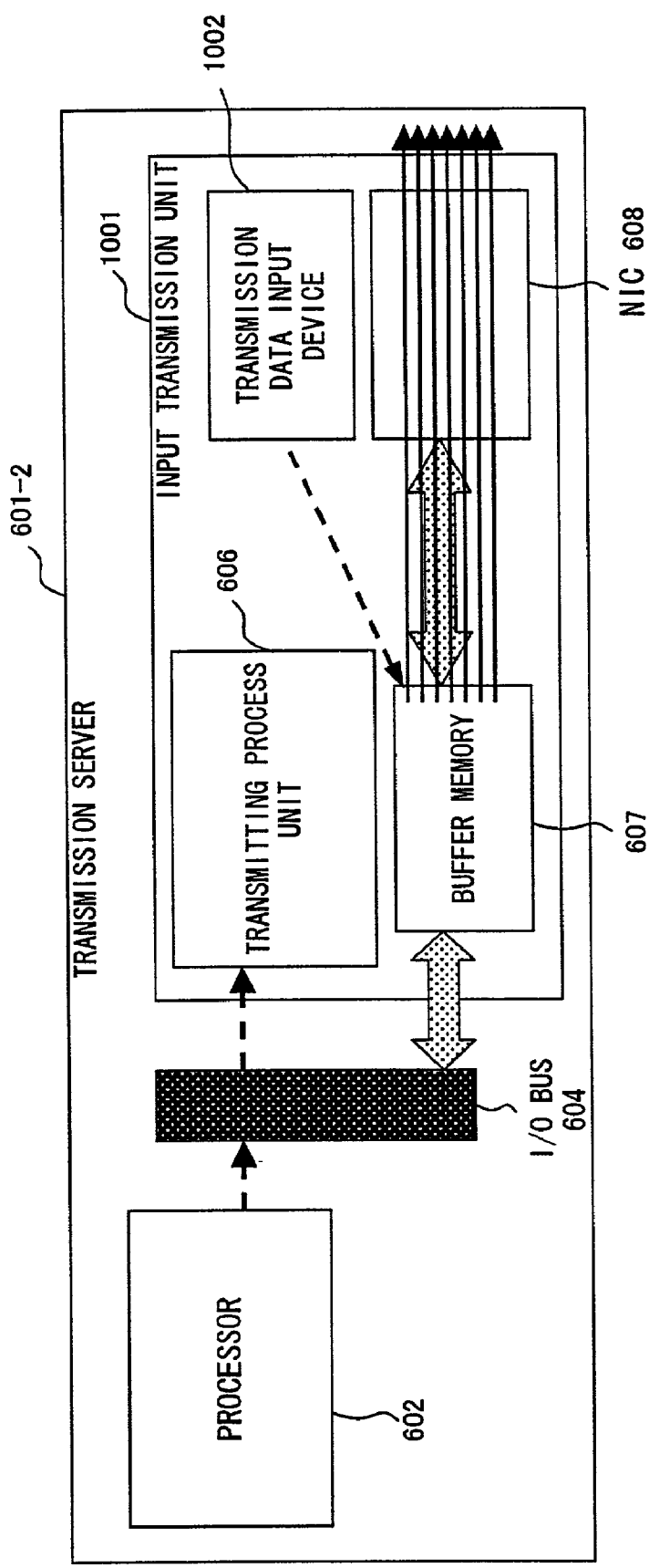
FIG. 10 shows the application (2) of the configuration indicating the principle of the present invention.
Figure 11:
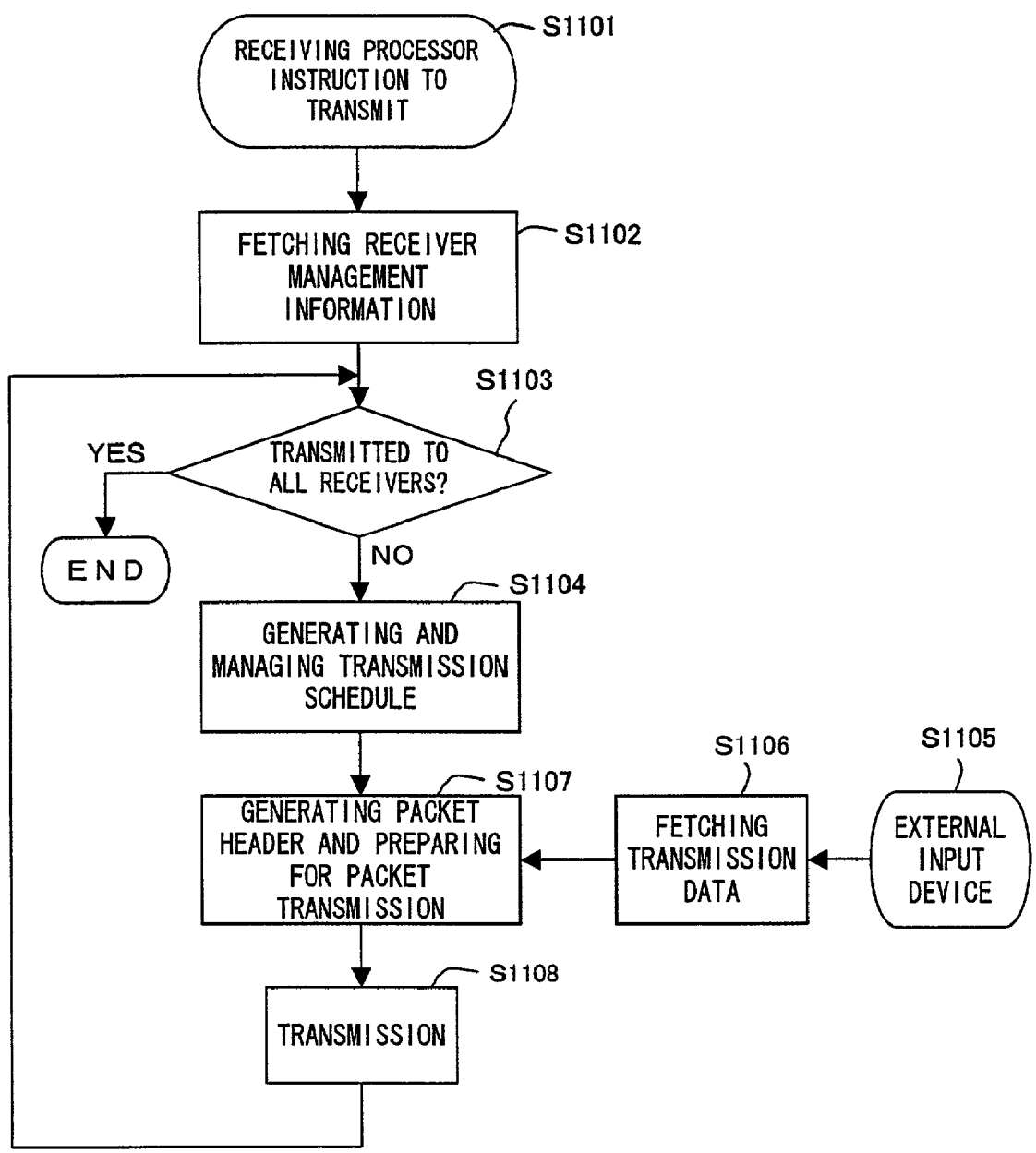
FIG. 11 shows the flow of the process of the transmission server shown in FIG. 10.

FIG. 11 shows the flow of the process of the transmission sever 601-2 shown in FIG. 10. First, the processor 602 issues an instruction to transmit data (S1101). Then, the receiver management information (S1102) is transferred to the input transmission unit 1001. Furthermore, the input transmission unit 1001 determines whether or not transmission data has been transmitted to all receivers (S1103), and the process terminates if YES. If NO, the transmission schedule is generated and managed (S1104), a packet header is generated, a packet is generated from the packet header and the transmission data (S1106) fetched by the external input device (S1105), and a preparation is made for transmitting the packet (S1107). Then, the packet is transmitted (S1108), and control is returned to S1103.

Figure 12:
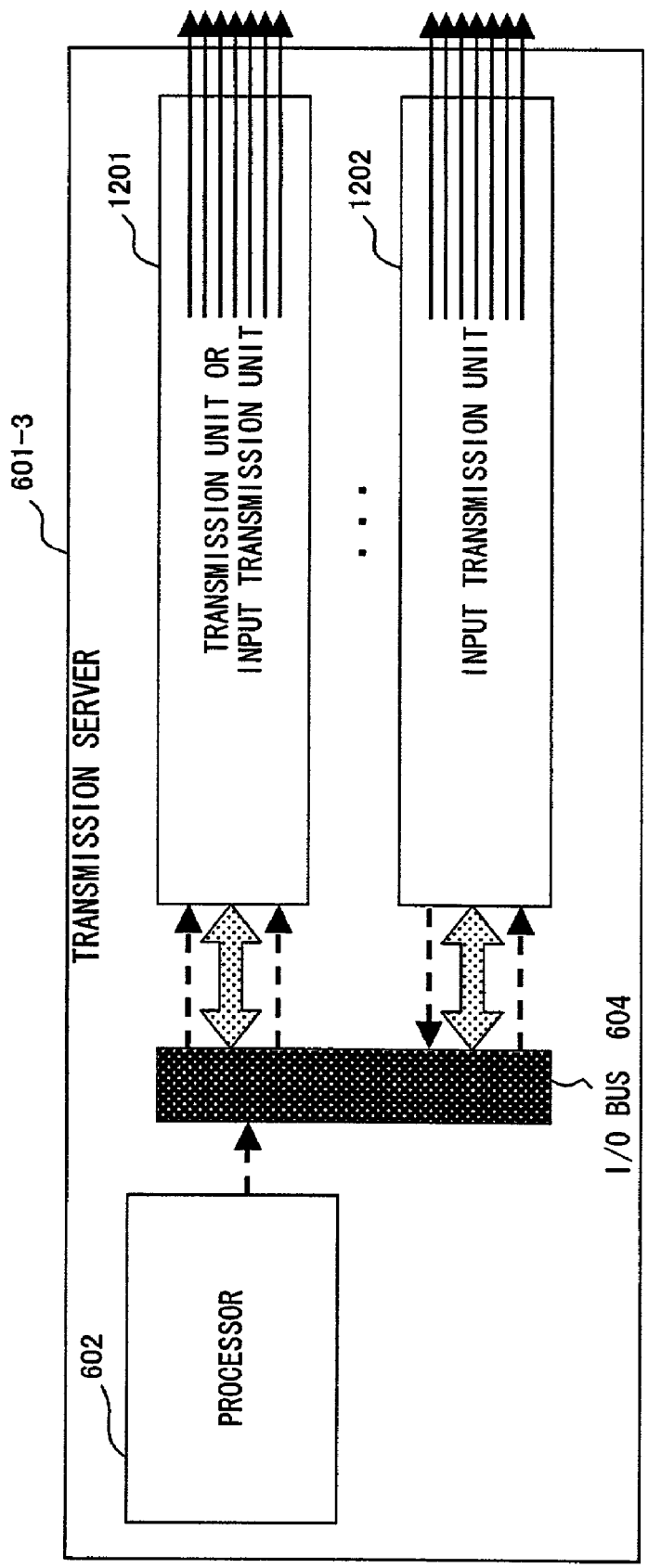
FIG. 12 shows the application (3) of the configuration indicating the principle of the present invention.

The input transmission unit 1001 of the transmission sever 601-2 shown in FIG. 10 can collectively input and transmit transmission data, but the number of receivers who can be simultaneously processed is limited by the capability of the input transmission unit 1001. Then, at least one input transmission unit 1202 and a plurality of transmission units or input transmission units 1201 are provided, and transmission data is transferred from one input transmission unit 1202 to another transmission unit or input transmission unit 1201 through an I/O bus, thereby improving the performance of the transmission server (FIG. 12). In this case, the processor 602 controls, as a part of the process of the receiver management, from where to where the transmission data is to be transferred.

Described below in detail is an embodiment of the present invention.

Transmission data can be the data stored in a disk or a file system, and can be fetched from an input device such as a camera, etc. Since the information processing device to which the present invention is applied can obtain transmission data in any method using the existing technology. The detailed explanation of the technology is omitted here.

In the following embodiment, the RTP (Real-time Transport Protocol) RFC1889 used as a communications protocol in Internet is used, but the present invention is not applied exclusively to the RTP.

The transmission server according to the present invention is an information processing device provided with an I/O bus such as a processor, buffer memory, a PCI bus, etc.

The transmission unit 605 shown in FIG. 6, etc. is connected to the I/O bus 604 through the connection unit such as a PCI, etc.

The transmission unit 605 is mounted on the I/O bus 604, and requires a processor much more specifically capable of performing a transmitting process than a processor of a server for physically limiting the cost, installation area, etc. However, since the transmission unit 605 is limited in process contents, a high-speed process can be realized by providing an exclusive mechanism depending on the process contents.

The transmission unit 605 holds the receiver information specified by the processor of the transmission server, buffers transmission data, and transmits a packet according to the specified communications condition. There are several methods to realize this mainly based on the following mechanism.

Figure 13:
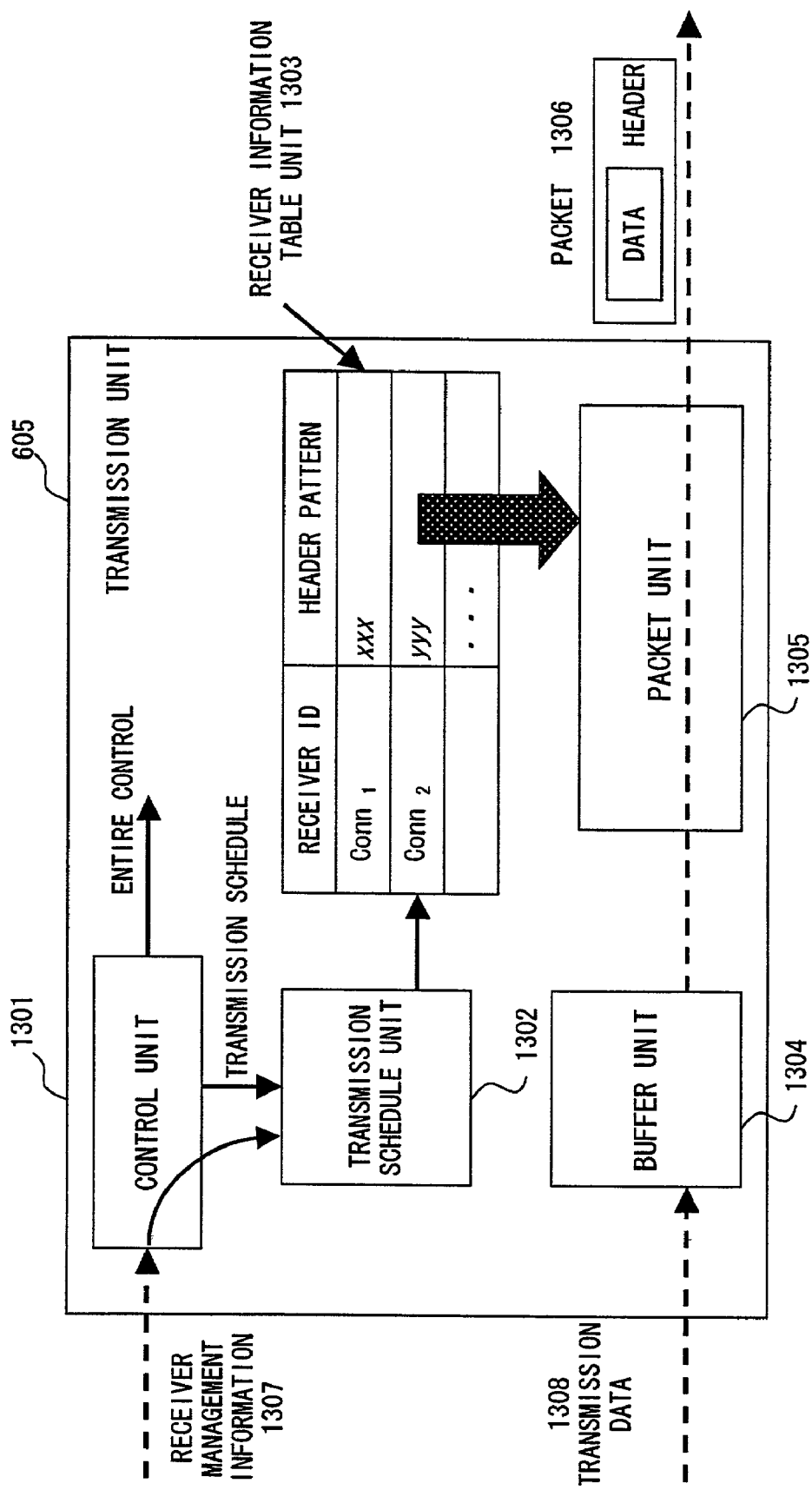
FIG. 13 shows an embodiment of the transmission unit.

FIG. 13 shows the detailed configuration of the transmission unit 605. The transmission unit 605 comprises a control unit 1301, a transmission schedule unit 1302, a receiver information table unit 1303, a buffer unit 1304, and a packet unit 1305. A receiver management information 1307 is provided from the processor 602 of the transmission server 601 to the control unit 1301. A transmission data 1308 is provided for the buffer unit 1304. The transmission schedule unit 1302 manages the transmission schedule, and the receiver information table unit 1303 manages the information about each receiver. The packet unit 1305 generates a packet 1306 based on the transmission data of the buffer unit 1304 and the information about the receiver, and transmits the packet. Each unit is described below.

The control unit 1301 communicates information with the processor 602 of the transmission server 601, controls the entire system including the inside of the transmission unit 605, the network, etc. As shown in FIG. 13, the control unit 1301 provides the receiver management information and the transmission schedule for the transmission schedule unit 1302. It also generates a transmission schedule according to the receiver management information 1307 provided by the processor 602 of the transmission server 601. The control unit 1301 can be configured by a less expensive controlling microprocessor and software.

The transmission schedule unit 1302 manages the information prescribing the order and timing of transmitting transmission data to a receiver. The buffer unit 1304 transmits each packet according to the information (the buffer unit 1304 is described below in detail). The transmission schedule can be provided as a part of the receiver management information 1307, or can be independently generated by the control unit 1301.

Figure 14:
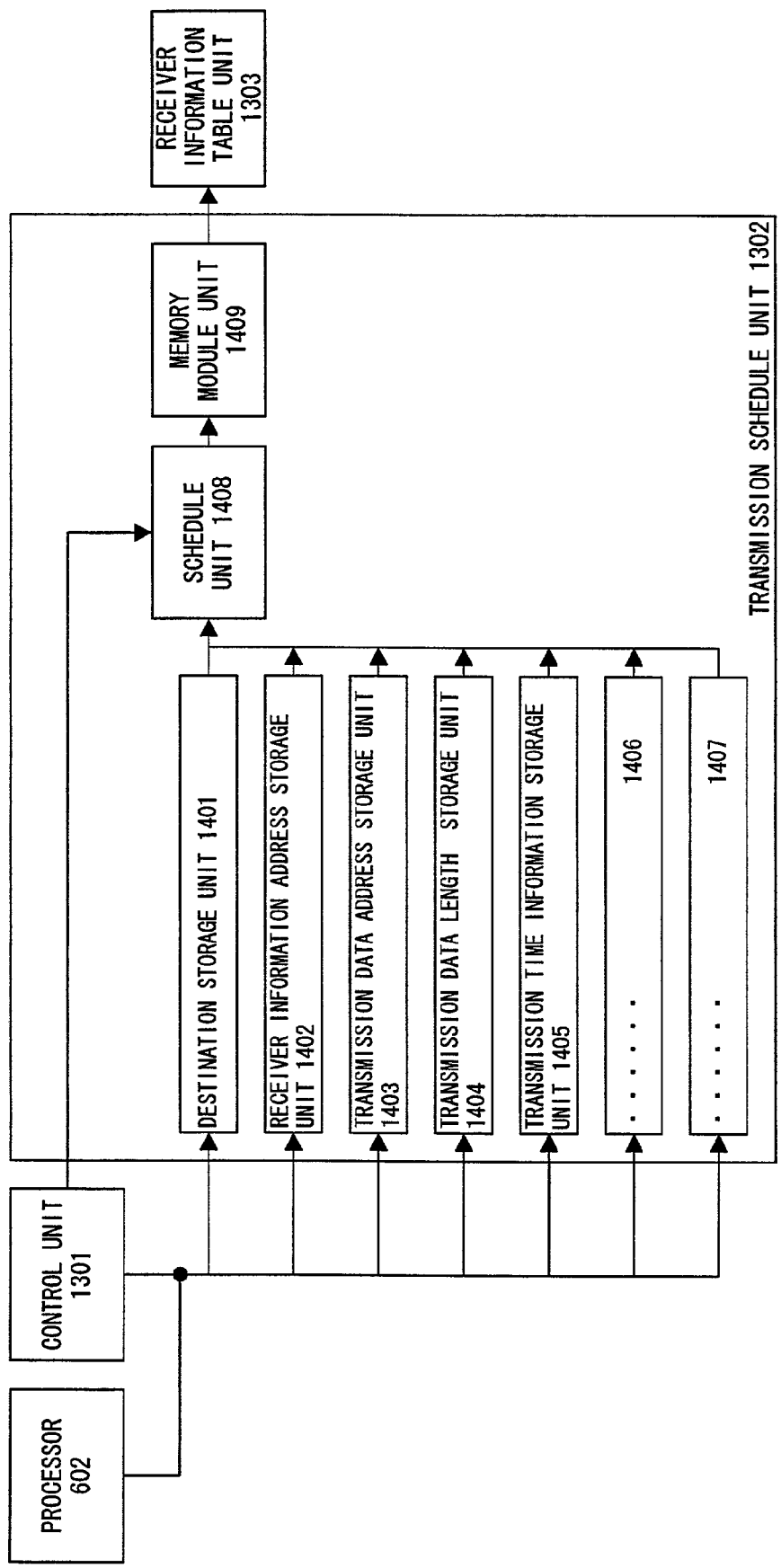
FIG. 14 shows the detailed transmission schedule unit.

FIG. 14 shows the detailed configuration of the transmission schedule unit 1302. The transmission schedule unit 1302 comprises storage units such as a destination storage unit 1401, a receiver information address storage unit 1402, a transmission data address storage unit 1403, a transmission data length storage unit 1404, a transmission time information storage unit 1405, etc. (1406 and 1407 denote portions for storing other information), a schedule unit 1408, and a memory module unit 1409.

Figure 15:
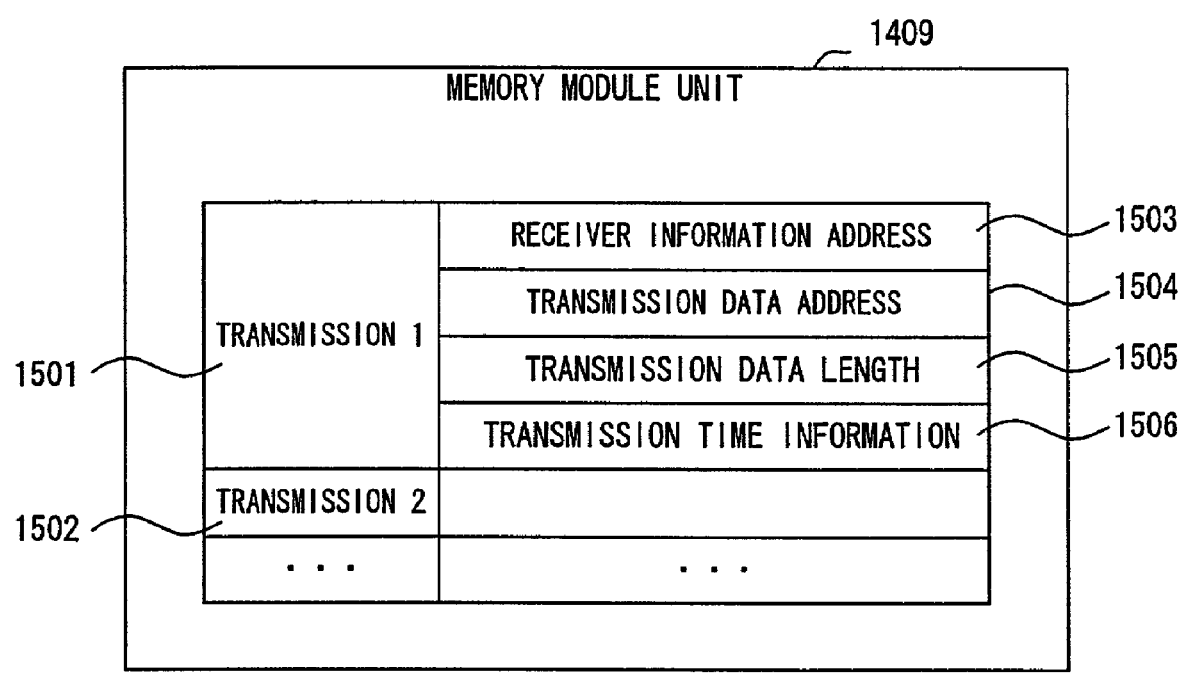
FIG. 15 shows an example of the configuration of the memory module unit of the transmission schedule unit.

FIG. 15 shows an example of the configuration of the memory module unit 1409. The information to be transmitted to each receiver is stored as transmission 1 (1501), transmission 2 (1502), . . . A receiver information address 1503 is a receiver information address and identifier of the receiver information table unit 1303. A transmission data address 1504 stores data to be transferred in the transmission data stored in the buffer unit 1304. A transmission data length 1505 is a data length to be transmitted in the current process. A transmission time 1506 is time information to be transmitted in the current process. For example, if the time transmitted in the previous process and the time to be transmitted in the next process are stored, the time information can be transmitted at predetermined time intervals. The information stored in the memory module unit 1409 is provided in a predetermined order and timing for the packet unit 1305.

FIG. 16 shows an example of adjusting a transmission schedule. FIG. 16 shows only important units of the memory module unit 1409, that is, a table containing a destination, a time parameter, and a data length. The time parameter indicates a packet transmission time interval as the information about the time of previous transmission and the time of subsequent transmission.

The transmission schedule unit 1302 adjusts the transmission schedule when it receives an instruction to change the destination from the processor 602 or the control unit 1301. For example, as shown in FIG. 16, when an instruction to insert a destination D is issued, the information about the receiver corresponding to the destination D is stored in a destination storage unit 901, a receiver information address storage unit 902, the transmission data address storage unit 1403, the transmission data length storage unit 1404, and the transmission time information storage unit 1405. The schedule unit 1408 obtains the place where the destination D is inserted according to the receiver information table unit 1303 or the receiver information management table, and updates the memory module unit 1409. In FIG. 16, the destination D is inserted between the destinations A and B. Similarly, a destination can be deleted. In FIG. 16, when an instruction to delete the destination B, the information about the receiver at the destination B is stored in the destination storage unit 1401, the receiver information address storage unit 1402, the transmission data address storage unit 1403, the transmission data length storage unit 1404, and the transmission time information storage unit 1405, and the schedule unit 1408 deletes the portion relating to the destination B in the memory module unit 1409.

Figure 17:
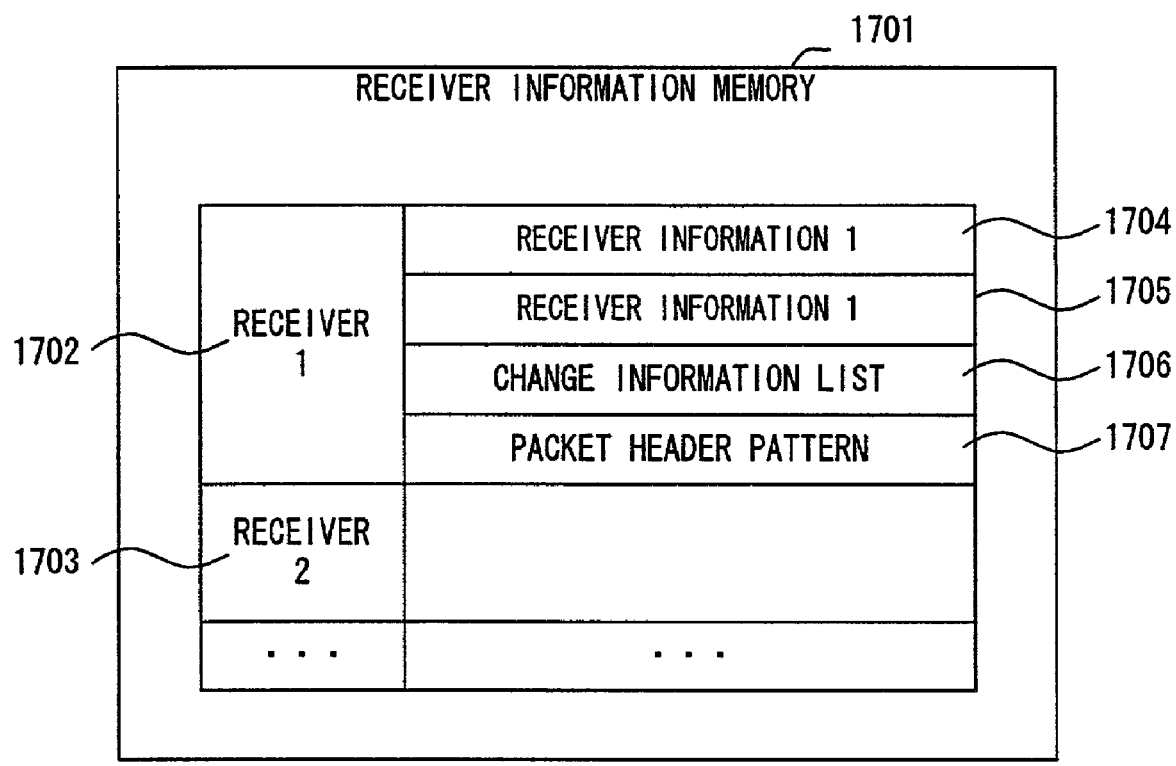
FIG. 17 shows an example of the configuration of a receiver information management table.

Described below is the receiver information table unit 1303. The receiver information table unit 1303 stores and manages information about each receiver in the receiver information table, and the packet unit 1305 generates a packet according to the information, and transmits it to a network FIG. 17 shows an example of the configuration of the receiver information management table. Receiver information 1 (1704) and receiver information 2 (1705) about each receiver (a receiver 1 (1702), a receiver 2 (1703), etc.) store the network address of a receiver, the protocol being used, network control information, etc. The packet header pattern 1707 stores information to be defined as fixed information after being converted into a packet format when the receiver information is first set. Thus, when the packet unit 1305 generates a packet according to the receiver information, the information converted into the packet format can be used. Therefore, the process can be efficiently performed. The change information list 1706 shows a list of a packet length, a checksum for error detection, a sequence number, a time stamp value, etc. defined depending on the protocol to be changed for each packet. When the RTP RFC 1889 is used, the information required as a packet header is an IP header, a UDP header, an RTP header (RTP/IPv4). In the information, the information variable for each packet of a receiver is shown as the shadowed portions shown in FIG. 18. Other portions are fixed information. The fixed information portion is stored in the receiver information management table as a packet formed by a header and data. Each time the information about a changed portion is computed and updated by the packet unit 1305 based on the change information list 1706.

Described below is the buffer unit 1304. The buffer unit 1304 stores transmission data which is the raw data transferred from the processor 602 of the transmission server, or the raw data obtained by the transmission data input device 1002. The packet unit 1305 reads data from the buffer unit 1304, and generates a packet. Normally, the data transfer length depends on each receiver. However, according to the present invention, transmission data is divided into blocks such that the packet unit 1305 can easily generate packets of different data transfer length from the transmission data, and auxiliary information is provided.

Figure 19:
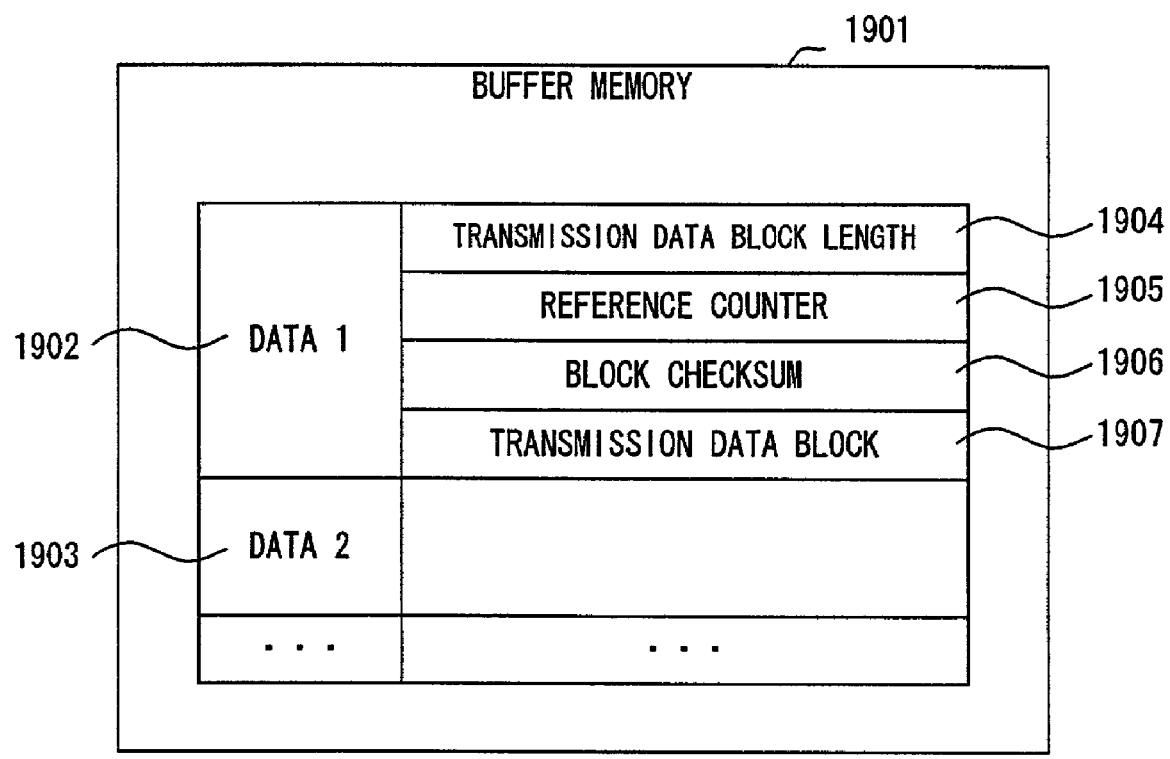
FIG. 19 shows an example of the configuration of the buffer unit.

FIG. 19 shows an example of the configuration of the buffer unit 1304. Transmission data is divided into and held as data blocks such as data 1 (1902), data 2 (1903), etc. A transmission data block length 1904 is a data length of the block. A reference counter 1905 refers to the number of the block from the item scheduled to be transmitted by the transmission schedule unit 1302. If the reference number is not 0, the transmission is not completely performed on the data block. If it is 0, then the block can be overwritten. A block checksum 1906 is a result of computing a sum of complements of 1 in a 16-bit unit from the data of the block. For example, the IP checksum value of two data blocks can be obtained by the sum of complements of 1 from block checksum values. Therefore, the packet unit 1305 can obtain the checksum value without computing all data. A transmission data block 1907 stores data. Described below in detail are the management of transmission data in the buffer unit 1304 (FIG. 20), and the block checksum 1906 (FIG. 21).

Figure 20:
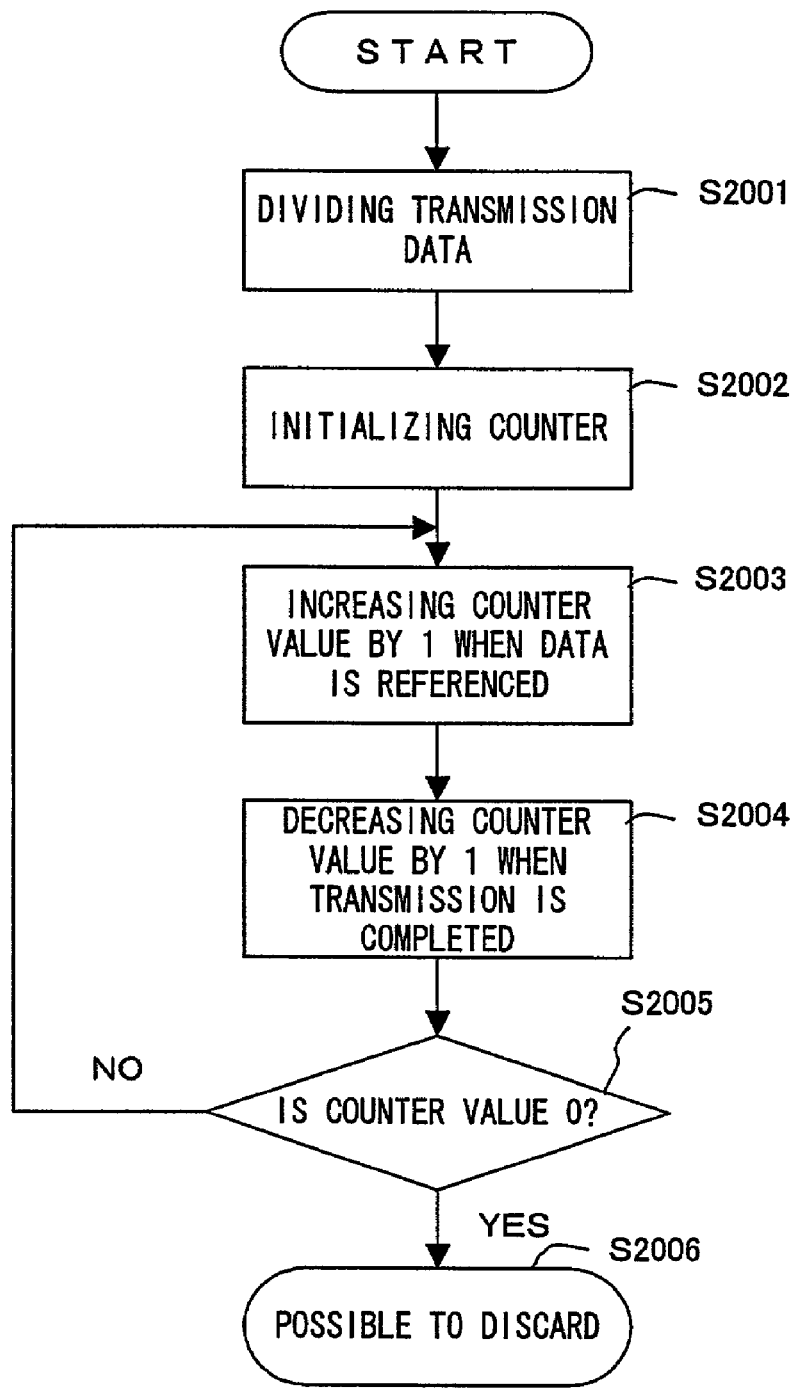
FIG. 20 shows the management of transmission data.

FIG. 20 is a flowchart of the management of transmission data by the buffer unit 1304. First, when the processor 602 provides transmission data in S2001, the transmission data is divided. The reference counter 1905 is initialized in S2002. When the transmission schedule unit 1302 refers to the data block from the transmission schedule unit 1302 in S2003, the corresponding reference counter 1905 is increased by 1, and the reference counter 1905 is decreased by 1 when the corresponding data block is completely transmitted in S2004. It is determined in S2005 whether or not the reference counter 1905 is 0. If it is not 0, control is returned to S2003. If it is 0, then the data in the data block is discarded for storage of new data.

Figure 21:
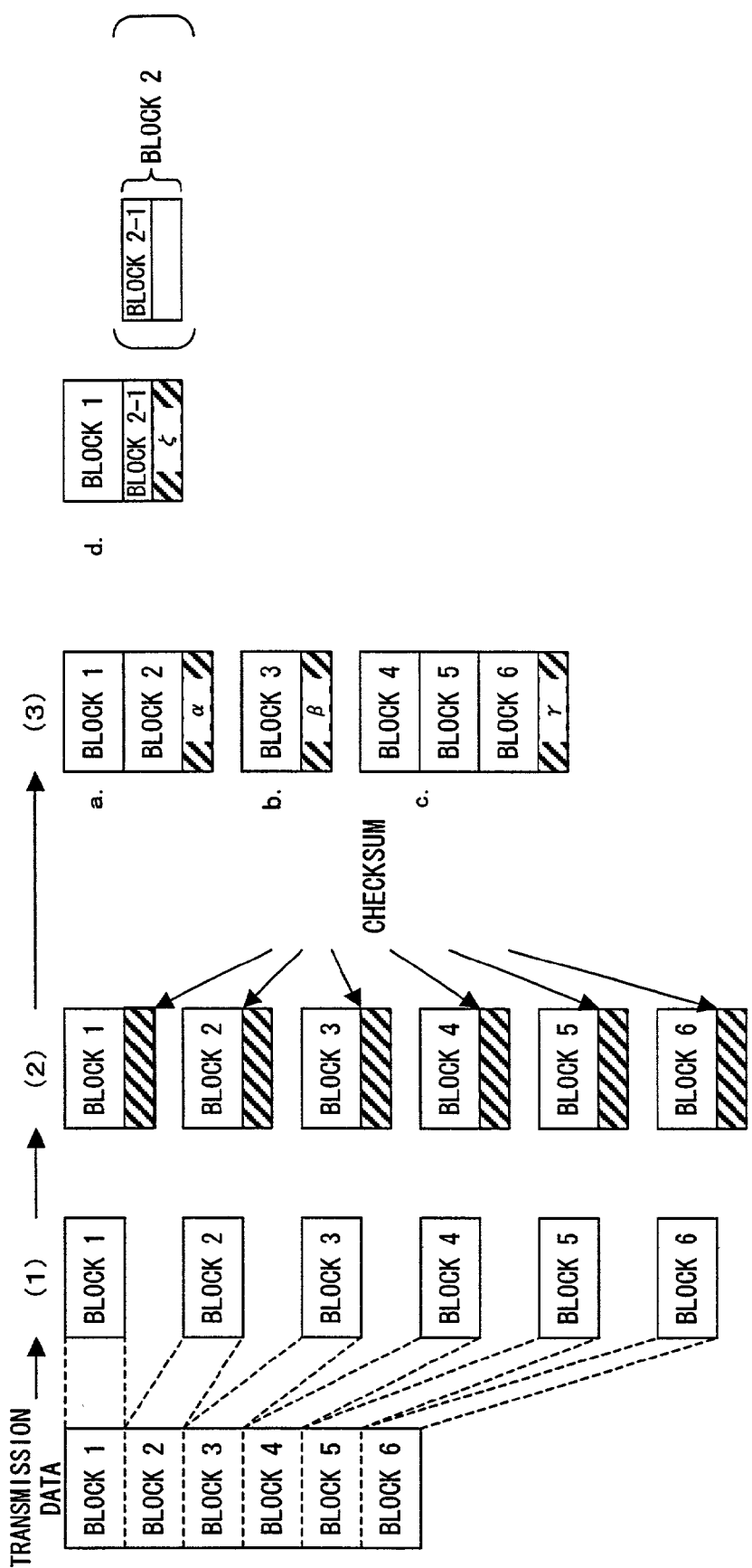
FIG. 21 shows a method of obtaining a checksum.

FIG. 21 shows the method of the packet unit 1305 computing the checksum value of packets from the block checksum. First, the transmission data is divided in (1). Then, a checksum is computed for each of the divided data blocks in (2). This is a result of obtaining a sum of complements of 1 in a 16-bit unit. As shown in (3), the packet unit 1305 obtains a checksum value. (3)a shows the process of transmitting blocks 1 and 2 in one packet. The checksum $\alpha$ is obtained by computing a sum of complements of 1 from the checksum of the blocks 1 and 2. (3)b shows the process of transmitting the block 2 in one packet. The checksum $\beta$ shows the checksum of the block 3 as is. (3)c chows the process of transmitting the blocks 4, 5, and 6 in one packet. The checksum $\gamma$ is obtained by computing a sum of complements of 1 from the checksum of the blocks 4, 5, and 6. (3)d shows the process of transmitting the block 1 and a part of the block 2 (block 2-1) in one packet. The checksum $\zeta$ is obtained by first obtaining the checksum of the block 2-1, and then adding the result to the checksum of the block 1. Thus, when the packet unit 1305 obtains a checksum, it is computed for each packet from the already obtained checksum of each block, thereby efficiently performing a process. In the above mentioned description, the checksum obtained by computing a sum of complements of 1. It is also possible to use other error detection code such as a CRC (cyclic code).

Described below is the packet unit 1305. The packet unit 1305 generates a packet based on the transmission data stored in the buffer unit 1304 and the receiver information table unit 1303 according to the transmission schedule, and transmits it to a network. The process of the packet unit 1305 can be performed at a high speed using an exclusive microprocessor and hardware.

Figure 22:
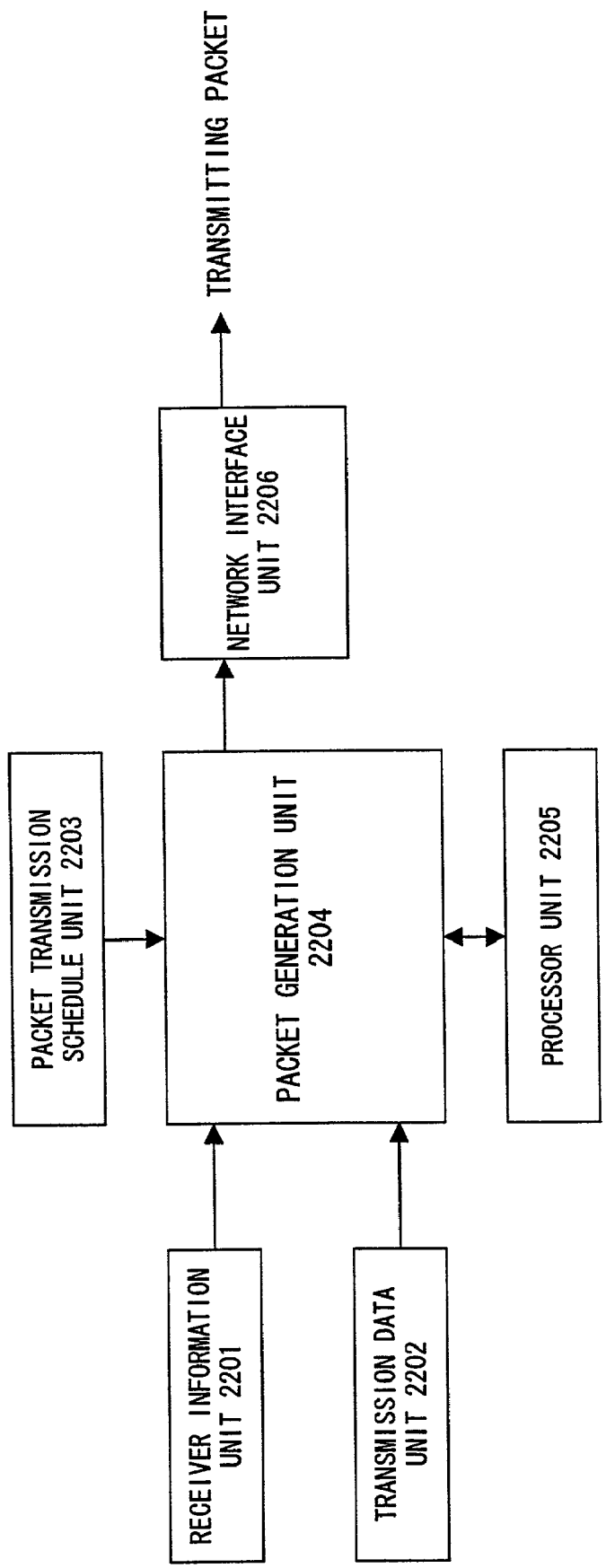
FIG. 22 shows the detailed explanation of the packet unit.
Figure 23:
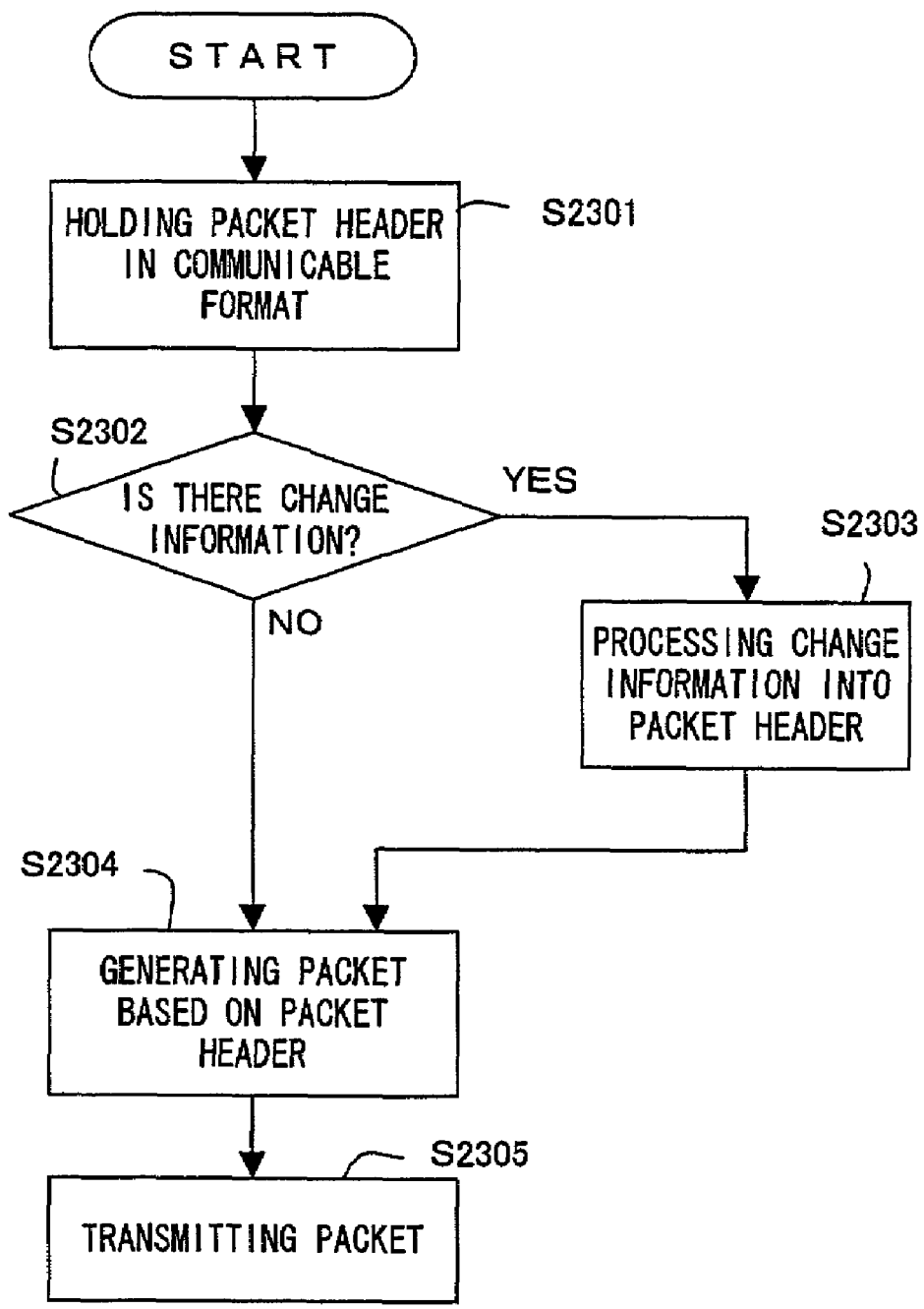
FIG. 23 shows the flow of the process of generating a packet.

FIG. 22 shows the detailed configuration of the packet unit 1305. The packet unit 1305 comprises a receiver information unit 2201, a transmission data unit 2202, a packet transmission schedule unit 2203, a packet generation unit 1704, a processor unit 1705, and a network interface unit 2206. The receiver information unit 2201 is connected to the receiver information table unit 1303, the transmission data unit 2202 is connected to the buffer unit 1304, and the packet transmission schedule unit 2203 is connected to the transmission schedule unit 1302. The receiver information unit 2201 and the transmission data unit 2202 are configured by buffer memory, and store data. When transmission data is provided for the packet transmission schedule unit 2203, a packet generation unit 2204 obtains the packet header of the receiver from the receiver information unit 2201, similarly obtains transmission data from the transmission data unit 2202, and combines them as a packet. At this time, since the packet header contains a fixed portion and a changed portion, it is determined in S2302 whether or not there is change information as shown in FIG. 23. If there is change information, the change information is processed into a packet header in S2303, and a packet is generated based on the packet header in S2304. The generated packet is transmitted to a network through the network interface unit 2206 (S2305).

As described above, each portion of the transmission unit 605 according to the present invention shown in FIG. 13 has been described by referring to FIGS. 14 through 23. FIG. 24 shows the interlocking process of each portion in the transmission unit 605. Assume that a packet is transmitted to a receiver corresponding to the transmission 1 of the memory module unit 1409 of the transmission schedule unit 1302 shown in FIG. 24 (2401). Identification information 2402 for obtaining the receiver information corresponding to the transmission 1 indicates A of the receiver information table unit 1303. Identification information 2403 indicates the address in the buffer unit 1304. If the packet transmission schedule unit 2203 of the packet unit 1305 is provided with the transmission schedule 'transmitting to the transmission 1', then the packet unit 1305 obtains the corresponding packet header from the receiver information table unit 1303 through the receiver information unit 2201 (2404), and similarly obtains the corresponding transmission data through the transmission data unit 2202 (2405). Then, the packet generation unit 2204 combines the packet header with the transmission data, generates the packet 1306, and transmits it to a network. The computation for a changed portion of the packet header obtained from the receiver information table unit 1303 is performed by the packet generation unit 2204.

Described below is the comparison between the present system and the conventional system. Assuming that the number of receivers is X, and K network adapters, that is, the transmission units according to the present system, and the NICs in the conventional system, are used, the I/O bus load is K, and the number of receivers processed in each network adapter is X/K. The process of the processor of the transmission server only includes the receiver management, the data preparation, and the primary transmission to each network adapter. According to the present system, the receiver management is proportional to the number X of receivers, the data preparation is made only once per transmission data type, and the primary transmission of data is proportional to K. According to the conventional system, every process is proportional to X. Since the receiver management process is performed only when the transmission is started and terminated, the load for a predetermined period is much smaller than in the transmitting process. Therefore, it is assumed that the processor load in the present system is equal to or smaller than K/X. Thus, according to the present system, the process load of the transmission server can be reduced, and the transmitting process performed in real time in most cases can be distributed to a plurality of network adapters. Therefore, the process load of each network adapter can be reduced. Furthermore, the load of the I/O bus can be reduced.

The process of transmitting a packet has been described above. FIG. 25 shows a transmission unit 2501 having the function of processing a received packet. The transmitting process unit 606, the transmission data input device 1002, the buffer memory 607, and the NIC 608 of the transmission unit 2501 have been described above. The received packet is transmitted from the NIC 608 to a receiving process unit 2502, and an identifying unit 2503 determines whether or not the packet can be processed in the transmission unit 2501. If it cannot be processed, then it is transmitted to the server processor. If it can be processed, then it is processed in the transmission unit 2501. Thus, the transmission unit 605 can be extended such that the unit can process a received packet.

Figure 26:
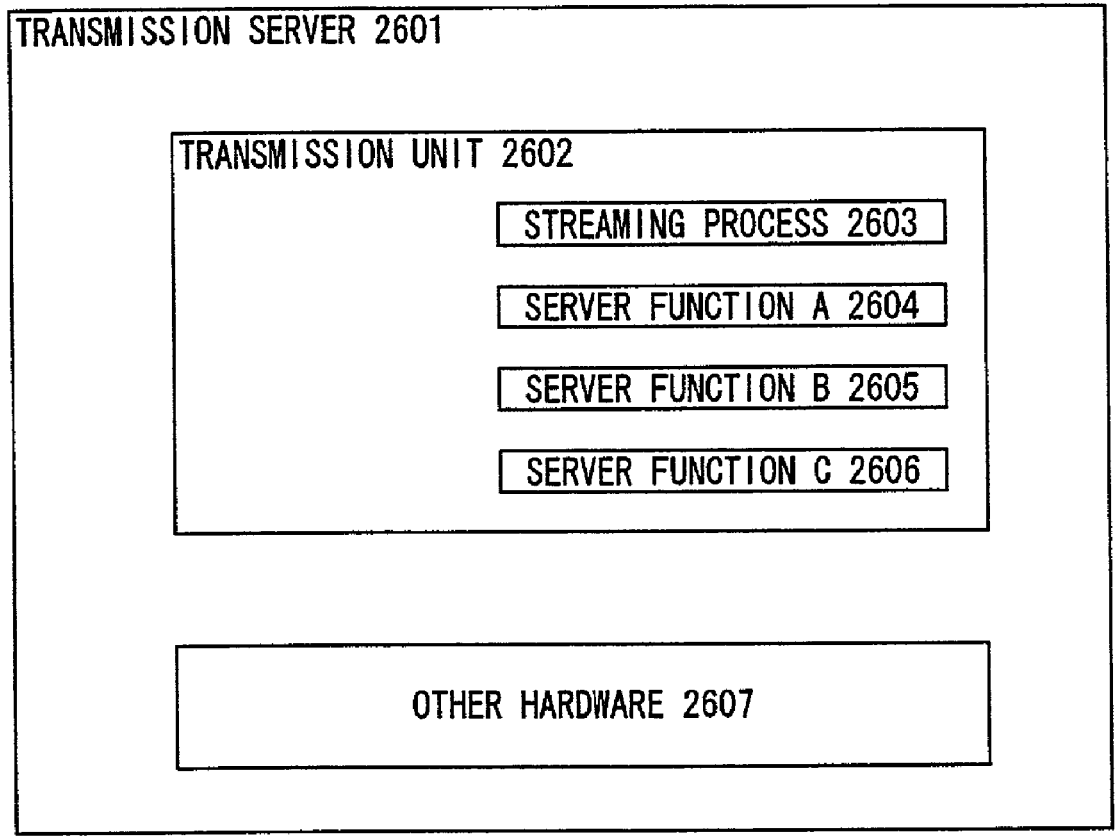
FIG. 26 shows an application of the transmission unit according to the present invention.

The processes performed by the transmission unit 605 are not limited to the processes described above. That is, the transmission unit 605 can execute various types of software as an intelligent NIC (network interface card) as shown in FIG. 26. In addition to a streaming process 2603 similar to the process of the transmission unit 605, a transmission unit 2602 of a transmission server 2601 includes a server function A 2604, a server function B 2605, and a server function C 2606 which correspond to the software executed in the transmission unit 2602. In FIG. 26, the hardware such as the processor, the I/O bus, etc. of the transmission server 2601 is included in other hardware 2607. Thus, the load, etc. of the processor of the transmission server 2601 can be reduced by the transmission unit 2602 executing the software other than the streaming process.

The embodiments of the present invention have been described above by referring to Internet, but the present invention is not limited to the application through Internet.

According to the present invention, as described above in detail, the transmission server on the transmission side in the broadcasting communications can increase the number of receivers who can be simultaneously provided with services without lowering the transmission quality. To be more practical, the processor load and the I/O load of the transmission server can be reduced with the transmission quality appropriately adjusted for each receiver.

What is claimed is:

1. An information processing device for performing broadcasting communications to a plurality of receivers, comprising:
   a processor;

a storage unit storing receiver information which comprises plural pieces of information wherein each of the plural pieces is a piece of information about one receiver of the plurality of the receivers;

an input/output bus; and a transmission unit; and the input/output bus provides connection among said transmission unit, the processor, and the storage unit;

the processor provides the receiver information stored in the storage unit to the transmission unit through the input/output bus; the transmission unit generates a packet for a specified receiver according to a transmission schedule including a transmission order and a transmission timing, and for each of the plurality of receivers based on the receiver information and transmission data; and the transmission unit transmits the packet to a connected network.

2. The device according to claim 1, further comprising a plurality of said transmission units, wherein said processor of said information processing device provides the same transmission data for the plurality of transmissions through the input/output bus, and provides different pieces of the receiver information for each transmission.

3. An information processing device for performing broadcasting communications to each of a plurality of receivers, comprising:

a processor;

a storage unit storing receiver information which comprises plural pieces of information wherein each of the plural pieces is a piece of information about one receiver of the plurality of the receivers;

an input/output bus; and a transmission unit; and the input/output bus provides connection among said transmission unit, the processor, and the storage unit;

the processor provides the receiver information stored in the storage unit to the transmission unit through the input/output bus;

the transmission unit generates a packet for each of the plurality of receivers based on the receiver information and transmission data;

the transmission unit transmits the packet to a connected network; and said transmission unit comprises:

a transmission schedule unit controlling a transmission schedule including a transmission order and transmission timing of a packet;

a receiver information management unit managing the receiver information;

a buffer unit storing and managing the transmission data; and a packet unit generating a packet for a specified receiver according to the transmission schedule, and transmitting the packet.

4. The device according to claim 3, wherein said transmission unit further comprises a transmission data input unit obtaining transmission data without receiving the transmission data from the processor of said information processing device.

5. The device according to claim 3, further comprising:

a plurality of the transmission units; and at least one input transmission unit comprising a transmission data input unit obtaining transmission data without receiving the transmission data from the processor of said information processing device, wherein transmission data is provided from said input transmission unit to another transmission unit through the input/output bus.

6. The device according to claim 3, wherein:

said receiver information contains information required by said packet unit to generate a packet for each receiver; and said receiver information management unit transfers to said packet unit a piece of the receiver information corresponding to the receiver specified by said packet unit.

7. The device according to claim 3, wherein said buffer unit manages management information for management of the transmission data, and auxiliary information for generation of a packet by said packet unit in addition to the transmission data.

8. An information processing device for performing broadcasting communications by a transmitter transmitting data to each of a plurality of receivers using a processor provided on a transmitter side, comprising:

a transmission unit generating a packet for each receiver based on information about a receiver and transmission data provided by the processor through an input/output bus, and transmitting the packet to a connected network; and a unit connecting said transmission unit to the processor of said information processing device through the input/output bus, and said transmission unit comprises:

a transmission schedule unit controlling a transmission schedule including a transmission order and transmission timing of a packet;

a receiver information management unit managing the receiver information;

a buffer unit storing and managing the transmission data; and a packet unit generating a packet for a specified receiver according to the transmission schedule, and transmitting the packet, and said transmission schedule unit provides identification information for obtaining a piece of information about a specified receiver from the receiver information managed by said receiver information management unit, identification information for obtaining, from said buffer unit, data to be transmitted to the specified receiver, and information relating to transmission of a packet based on an order and timing predetermined for said packet unit.

9. The device according to claim 8, wherein said information relating to transmission of a packet contains information relating to a time at which a packet has previously been transmitted, and a time at which a packet is to be transmitted next time.

10. An information processing device for performing broadcasting communications by a transmitter transmitting data to each of a plurality of receivers using a processor provided on a transmitter side, comprising:

a transmission unit generating a packet for each receiver based on information about a receiver and transmission data provided by the processor through an input/output bus, and transmitting the packet to a connected network; and a unit connecting said transmission unit to the processor of said information processing device through the input/output bus, and said transmission unit comprises:

a transmission schedule unit controlling a transmission schedule including a transmission order and transmission timing of a packet;

a receiver information management unit managing the receiver information;

a buffer unit storing and managing the transmission data; and a packet unit generating a packet for a specified receiver according to the transmission schedule, and transmitting the packet, said receiver information contains information required by said packet unit to generate a packet for each receiver and said receiver information management unit transfers to said packet unit a piece of the receiver information corresponding to the receiver specified by said packet unit, and each piece of said receiver information contains information formed in a format of packet header information required when the transmission data is to be transmitted to a network; and each piece of said receiver information contains change information for identification of a fixed portion and a portion to be changed for each packet.

11. The device according to claim 10, wherein said packet unit processes only the portion to be changed according to the change information, generates packet header information using the fixed portion that is unprocessed, generates a packet by combining the transmission data with the packet header information, and transmits the packet to a network.

12. An information processing device for performing broadcasting communications by a transmitter transmitting data to each of a plurality of receivers using a processor provided on a transmitter side, comprising:

a transmission unit generating a packet for each receiver based on information about a receiver and transmission data provided by the processor through an input/output bus, and transmitting the packet to a connected network; and a unit connecting said transmission unit to the processor of said information processing device though the input/output bus, and said transmission unit comprises:
a transmission schedule unit controlling a transmission schedule including a transmission order and transmission timing of a packet;

a receiver information management unit managing the receiver information;

a buffer unit storing and managing the transmission data; and a packet unit generating a packet for a specified receiver according to the transmission schedule, and transmitting the packet, said buffer unit manages management information for management of the transmission data, and auxiliary information for generation of a packet by said packet unit in addition to the transmission data, and said buffer unit divides the transmission data into transmission data blocks having a predetermined length, and manages said transmission data block with the management information and the auxiliary information added to the block.

13. The device according to claim 12, wherein:

said management information is information relating to a length of the transmission data block, and information relating to a number of receivers who are to receive the transmission data block; and said auxiliary information refers to an error detection code of the transmission data block.

14. The device according to claim 13, wherein:

said information relating to the number of receivers to receive the transmission data block is represented by a counter showing a number of receivers requiring the transmission data block;

a corresponding counter increases its value by 1 each time said transmission schedule unit refers to the transmission data block as data to be transmitted to a receiver;

a corresponding counter decreases its value by 1 each time said packet unit completes transmitting the transmission data block; and said corresponding transmission data block is discarded when said buffer unit decreases said counter by 1 into 0.

15. The device according to claim 13, wherein said error detection code is a checksum of the transmission data block.

16. The device according to claim 15, wherein said checksum is obtained as a result of computing a sum of complements of 1 in a length unit equal to or longer than 16 bits predetermined for the transmission data block.

17. An information processing device for performing broadcasting communications by a transmitter transmitting data to each of a plurality of receivers using a processor provided on a transmitter side, comprising:

a transmission unit generating a packet for each receiver based on information about a receiver and transmission data provided by the processor through an input/output bus, and transmitting the packet to a connected network; and a unit connecting said transmission unit to the processor of said information processing device through the input/output bus, and said transmission unit comprises:
a transmission schedule unit controlling a transmission schedule including a transmission order and transmission timing of a packet;

a receiver information management unit managing the receiver information;

a buffer unit storing and managing the transmission data; and a packet unit generating a packet for a specified receiver according to the transmission schedule, and transmitting the packet, and said transmission unit further comprises:
a reception unit receiving a packet from a network;

a received packet identification unit identifying whether or not the packet received by said reception unit can be processed by said transmission unit; and a received packet processing unit processing the packet determined as processable by said received packet identification unit, and transferring the packet determined as unprocessable to the processor of said information processing device.

18. A network adapter provided in an information processing device which performs broadcasting communications to a plurality of receivers, comprising:

a transmission schedule unit controlling a transmission schedule including a transmission order and timing of a packet;

a receiver information management unit managing receiver information which is provided by a processor of the information processing device and comprises plural pieces of information, each of the plural pieces is a piece of information about one receiver of the plurality of the receivers;

a buffer unit storing and managing transmission data;

a packet unit generating a packet for each of specified plural receivers based on the receiver information and the transmission data according to the transmission schedule, and transmitting the packet; and a transmission data input unit obtaining transmission data without receiving transmission data from a processor of said information processing device.

19. A network adapter provided in an information processing device which performs broadcasting communications by a transmitter transmitting data to each receiver to a plurality of receivers, comprising:

a transmission schedule unit controlling a transmission schedule including a transmission order and timing of a packet;

a receiver information management unit managing information about the receivers;

a buffer unit storing and managing transmission data;

a packet unit generating a packet for a specified receiver according to the transmission schedule, and transmitting the packet;

a reception unit receiving a packet from a network;

a received packet identification unit identifying whether or not the packet received by said reception unit can be processed by said network adapter; and a received packet processing unit processing the packet determined as processable by said received packet identification unit, and transferring the packet determined as unprocessable to the processor of said information processing device.

20. A method for generating a packet by an information processing device on a transmitter side for performing broadcasting communications to a plurality of receivers, and transmitting the packet, comprising:

transferring receiver information to a network adapter in said information processing device by a processor of the information processing device, the receiver information comprises plural pieces of information and each of the plural pieces is a piece of information about one receiver of the plurality of the receivers;

obtaining transmission data by the network adapter;

generating a packet for each of the plurality of receivers by the network adapter in said information processing device based on the receiver information and the transmission data;

transmitting the generated packet by the network adapter of said information processing device;

holding the receiver information about the receiver in a format of packet header information in advance; and dividing the transmission data into blocks, and holding the blocks with management information corresponding each block and auxiliary information for generation of a packet added to each block.

21. A method for generating a packet by an information processing device on a transmitter side for performing broadcasting communications to a plurality of receivers, and transmitting the packet, comprising:

transferring receiver information to a network adapter in said information processing device by a processor of the information processing device wherein the receiver information comprises plural pieces of information and each of the plural pieces is a piece of information about one receiver of the plurality of the receivers;

obtaining transmission data by the network adapter;

generating a packet for each of the plurality of receivers by the network adapter in said information processing device based on the receiver information and the transmission data; and transmitting the generated packet by the network adapter of said information processing device, and said network adapter of said information processing device generates and transmits a packet for a specified receiver according to a transmission schedule including a transmission order and timing of the packet.

22. A method for generating a packet by an information processing device on a transmitter side for performing broadcasting communications, and transmitting the packet, comprising:

generating a packet for each receiver by a network adapter in said information processing device based on information about a receiver from a processor of said information processing device and transmission data; and transmitting the generated packet by the network adapter of said information processing device, holding the receiver information in a format of packet header information in advance; and dividing the transmission data into blocks, and holding the blocks with management information corresponding each block and auxiliary information for generation of a packet added to each block; and said network adapter of said information processing device generates and transmits a packet for a specified receiver according to a transmission schedule including a transmission order and timing of the packet.

* * * * *

UNITED STATES PATENT AND TRADEMARK OFFICE
CERTIFICATE OF CORRECTION

PATENT NO. : 7,161,940 B2 Page 1 of 1
APPLICATION NO. : 10/067295
DATED : January 9, 2007
INVENTOR(S) : Akira Jinzaki It is certified that error appears in the above-identified patent and that said Letters Patent is hereby corrected as shown below:

Column 13, Line 41, change "though" to --through--.

Signed and Sealed this

Tenth Day of April, 2007

JON W. DUDAS
*Director of the United States Patent and Trademark Office*